(12) United States Patent
Ogikubo et al.

(10) Patent No.: US 7,414,774 B2
(45) Date of Patent: Aug. 19, 2008

(54) METHOD OF DRIVING SMALL ELECTROMECHANICAL ELEMENT AND SMALL ELECTROMECHANICAL ELEMENT ARRAY

(75) Inventors: Shinya Ogikubo, Kanagawa (JP); Hirochika Nakamura, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 19 days.

(21) Appl. No.: 11/494,511

(22) Filed: Jul. 28, 2006

(65) Prior Publication Data
US 2007/0024952 A1   Feb. 1, 2007

(30) Foreign Application Priority Data
Jul. 28, 2005   (JP)   ............ P2005-219236

(51) Int. Cl.
*G02B 26/00* (2006.01)
(52) U.S. Cl. .................................. 359/291; 359/290
(58) Field of Classification Search .............. 359/237, 359/238, 290, 291; 361/233; 200/181, 404
See application file for complete search history.

(56) References Cited

U.S. PATENT DOCUMENTS 5,715,337 A * 2/1998 Spitzer et al. .............. 385/4
5,835,336 A * 11/1998 Knipe et al. ............ 361/233
2005/0219676 A1* 10/2005 Kimura et al. ............ 359/238
2005/0243398 A1* 11/2005 Latypov .................... 359/237
2006/0033997 A1* 2/2006 Bell et al. ................. 359/618
2006/0227405 A1* 10/2006 Regan ...................... 359/290
2006/0285193 A1* 12/2006 Kimura et al. ............ 359/291
2007/0008674 A1* 1/2007 Mochizuki et al. ........ 361/233
2007/0081225 A1* 4/2007 Aubuchon ................ 359/291
2007/0121192 A1* 5/2007 Lee et al. ................. 359/291

FOREIGN PATENT DOCUMENTS

JP    10-48543 A    2/1998

\* cited by examiner

*Primary Examiner*—Ricky L Mack
*Assistant Examiner*—Mahidere S Sahle
(74) *Attorney, Agent, or Firm*—Sughrue Mion, PLLC

(57) ABSTRACT

A method of driving a small electromechanical element, which includes: an elastic portion accumulating an elastic energy by being deformed elastically; a movable portion supported by the elastic portion; and a drive source exerting a physical acting force to maintain the movable portion, is provided. The movable portion is displaced to one normal position, an elastic energy is accumulated to the elastic portion, thereafter, the movable portion is maintained at one normal position by a physical acting force. Further, by releasing the elastic energy by stopping the physical acting force, the movable portion is displaced to other normal position while accumulating again an elastic energy having a polarity reverse to that of the preceding elastic energy and is maintained at other normal position. Thereby, the movable portion is displaced only by the elastic energy accumulated to the elastic portion without depending on the physical acting force from outside.

16 Claims, 25 Drawing Sheets

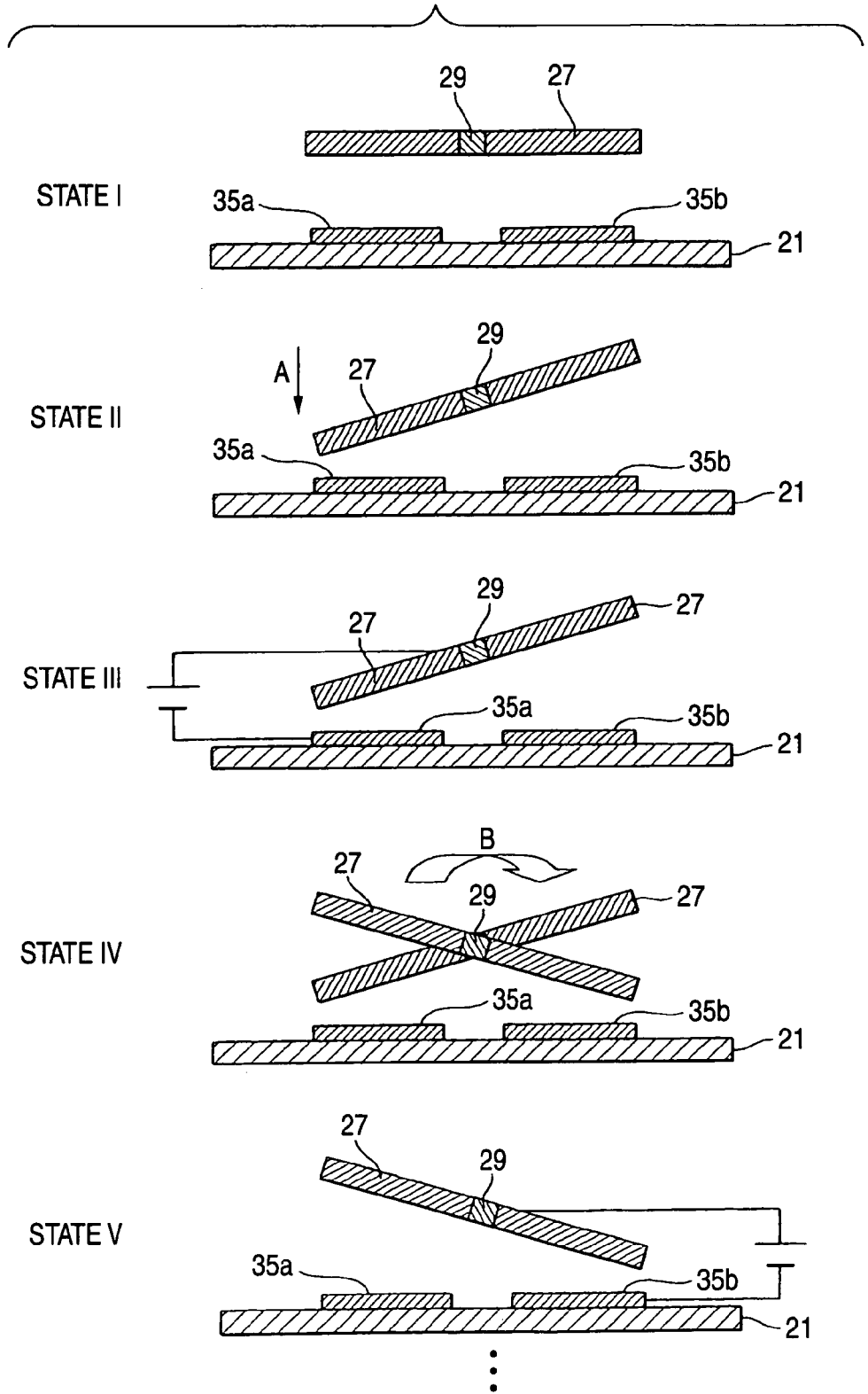

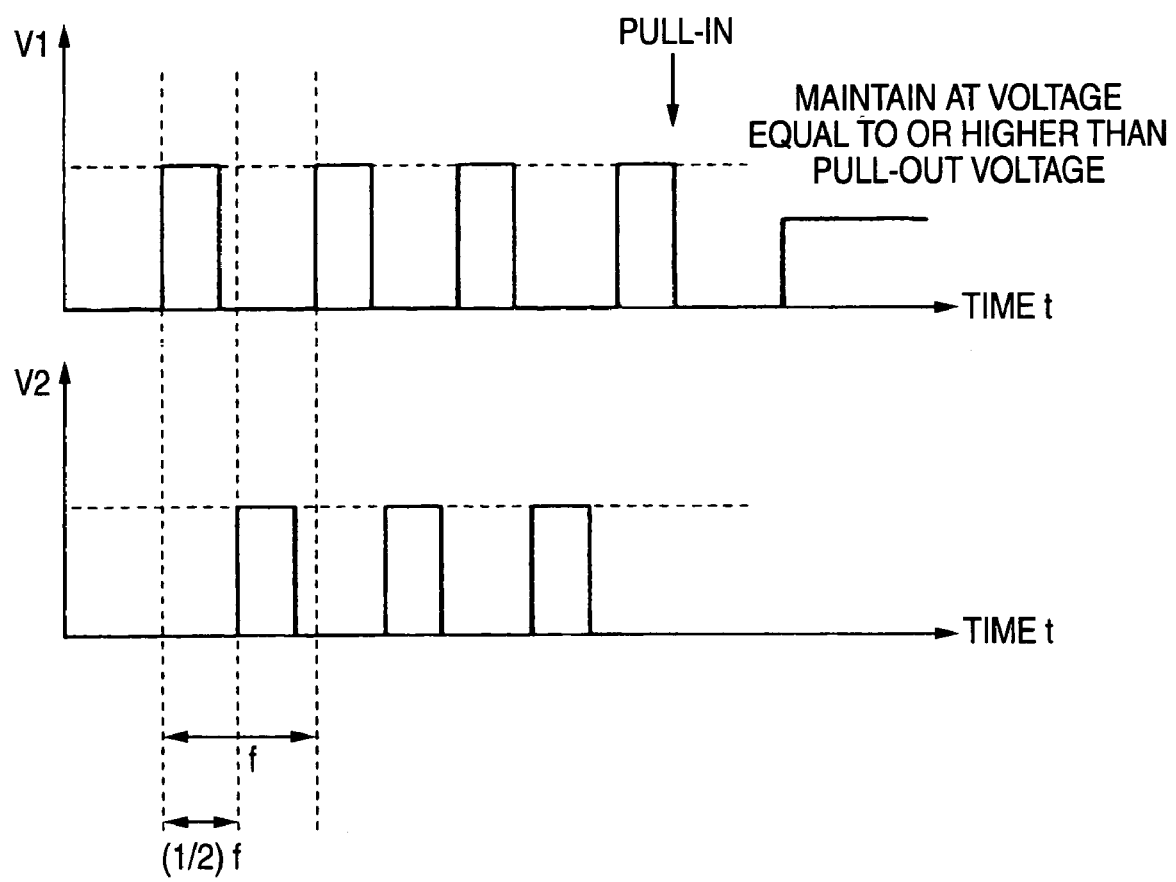

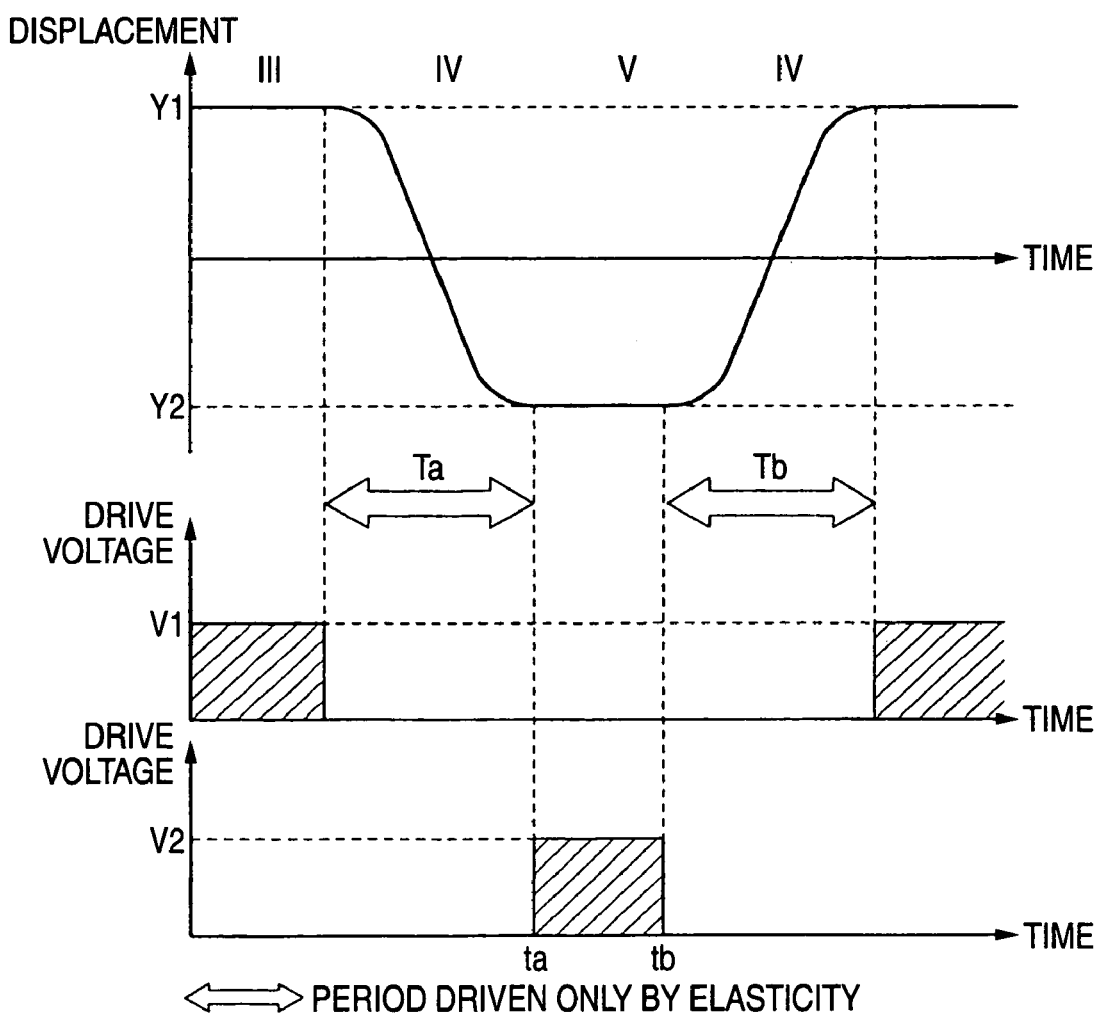

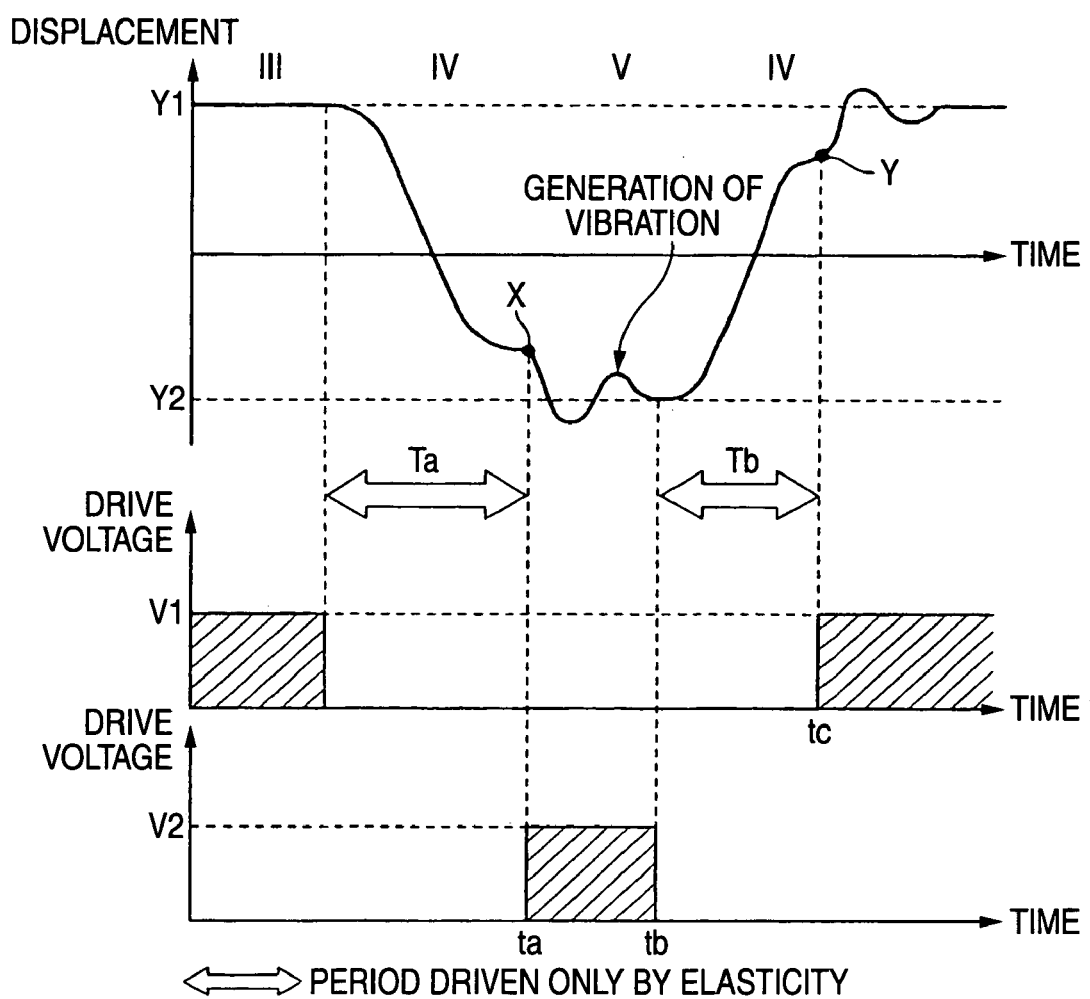

METHOD OF DRIVING SMALL ELECTROMECHANICAL ELEMENT AND SMALL ELECTROMECHANICAL ELEMENT ARRAY

FIELD OF THE INVENTION

The present invention relates to a method of driving a small electromechanical element and a small electromechanical element array, particularly relates to a method of driving a small electromechanical element and a small electromechanical element array power consumption of which is small and which can be operated by a high speed cycle.

BACKGROUND OF THE INVENTION

In recent years, by rapid progress of an MEMS technology (Micro-Electro Mechanical systems), a development of a small mechanical element for electrically displacing or moving a small mechanical element of μm order has intensively been carried out. As the small electromechanical element, there is, for example, a digital micromirror device (DMD) for deflecting light by inclining a micromirror, an optical switch for switching an optical path or the like. DMD has a wide use in a field of an optical information processing such as a projecting display, a video monitor, a graphic monitor, a television set and electrophotography printing and so on. Further, an optical switch is expected to be applied to optical communication, optical interconnection (signal connecting technology by light such as an intercoupling network in parallel computers), an optical information processing (information processing by optical operation) and the like.

With regard to a method of driving a small electromechanical element array of DMD or the like of a background art, there is a description of JP-A-10-48543 shown below. The driving method of the background art will be explained in reference to FIG. 23 through FIG. 25. FIG. 23 is a constitution view of two elements of a small electromechanical element array. A semiconductor board 1 is formed with a driving circuit, not illustrated, at inside thereof, and a surface portion of the semiconductor board 1 is formed with movable mirrors 2, 3.

The respective movable mirrors 2, 3 are supported above hollow spaces by hinges 6 hung between stays 4, 5 erected on the surface of the semiconductor board 1, and made to be pivotable in a left and right direction by constituting centers of pivot by the hinge 6. The hinge 6 is integrally formed with electrode films 7, 8 in the left and right direction interposing the hinge 6, and the surface of the semiconductor board 1 is formed with fixed electrode films 9, 10 at positions opposed to the electrode films 7, 8.

When a bias voltage Vb=24 V is applied as a control voltage to the hinge 6 (electrode films 6, 7) of the movable mirror 2 and an address voltage Va=0 V is applied to the fixed electrode 9 and an address voltage Va2=5 V is applied to the fixed electrode film 10 respectively as element displacing signals, a voltage difference between the electrode films 7, 9 becomes DV=24 V, a voltage difference between the electrode films 8, 10 becomes DV=19 V, by a difference between an electrostatic force between the electrode films 7, 9 and an electrostatic force between the electrode films 8, 10, the movable mirror 3 is inclined in a direction of bringing the electrode films 8, 10 into contact with each other. The illustrated state shows a state of inclining the movable mirror by −10°.

Similarly, when the bias voltage Vb=24 V is applied to the hinge 6 (electrode films 7, 8) of the movable mirror 2, and an address voltage Va1=0 V is applied to the fixed electrode film 9, and an address voltage Va2=5 V is applied to the fixed electrode film 10, a voltage difference between the electrode films 7, 9 becoems DV=19 V, a voltage difference between the electrode films 8, 9 becomes DV=24 V, and by a difference between an electrostatic force between the electrode films 7, 9 and an electrostatic force between electrode films 8, 10, the movable mirror 3 is inclined in a direction of bringing the electrode films 7, 9 into contact with each other. The illustrated state shows a state of inclining the movable mirror 3 by +10°.

When incident light is irradiated to the movable mirrors 2, 3, directions of reflected light differs in accordance with inclinations of the movable mirrors 2, 3, and by controlling the inclinations of the movable mirrors 2, 3, the directions of the reflected light can be controlled to be ON/OFF. However, it is difficult to operate a plurality of mirrors in the same direction or a reverse direction independently and simultaneously and therefore, in the background art, the movable mirror is controlled to be driven by carrying out a complicated voltage control. The control will be explained in reference to FIG. 24, FIG. 25.

A topmost stage of FIG. 24 shows the inclined movable mirror 2. When the movable mirror 2 inclined to a left side is changed to a following state, there are two ways in the "following state". That is, there are a case of inclining to an opposed side (right side) and a case of inclining to the same side (left side) (case of maintaining an inclined state). To which state the movable mirror 2 is changed depends on image data formed when the small electromechanical element array is used as an image forming apparatus.

Drawings on the left side of FIG. 24 surrounded by a frame at a lower stage show a case of displacing the movable mirror 2 to the opposed side (Crossover transition) and drawings on the right side show a case of maintaining a state of inclining the movable mirror 2 as it is (Stay transition). The address voltages Va1, Va2 applied to the fixed electrode films 9, 10 of the respective movable mirrors 2, 3 are controlled for the respective movable mirrors 2, 3, and the bias voltage Vb is commonly applied to all of the movable mirrors.

When the state of inclining the movable mirror is transited to the following state, the bias voltage Vb is changed as shown by FIG. 25. When a time period from starting to change the movable mirror to finishing to change the movable mirror is divided into zones, Za, Zb, Zc, Zd, Ze, first, at zone Za, the bias voltage is constituted by Vb=24 V, at zone Zb, Vb=−26 V. At next zone in Zc, Vb=7.5 V, at zone Zd, the bias voltage is returned to Vb=24 V, and at zone Ze, the bias voltage is maintained at Vb=24 V.

At zone Za, the address voltages Va1, Va2 are rewritten to 0 V or 5 V. In changing the movable mirror to the following state, when the movable mirror is intended to incline by making the electrode films 7, 8 integrally moved with the movable mirror proximate to the fixed electrode film 9, the voltage Va1 applied to the fixed electrode films 9 is set to 5 V and the voltage Va2 applied to the electore film 10 on the opposed side is set to 0 V. Further, when the movable mirror is intended to incline by making the electrode films 7, 8 proximate to the fixed electrode film 10, the voltage Va2 applied to the fixed electrode film 10 is set to 5 V and the voltage Va1 applied to the electrode film 9 on the opposed side is set to 0 V. Therefore, the address voltages Va1, Va2 are also referred to as element displacing signals.

When the applied voltage is controlled in this way, as shown by the left side (crossover side) of FIG. 24, at zone Zb, the bias voltage becomes Vb=−26 V, the voltage difference becomes DV=33.5 V between the electrode films 8, 10, and the voltage difference becomes DV=26 V between the electrode films 7, 9. Thereby, the movable mirror 2 is applied with an electrostatic force of inclining the movable mirror 2 further to the left side, and the electrode film 8 is further pressed to the fixed electrode film 10 in a state of being brought into contact with the fixed electrode film 10 and elastically deformed. Further, although the state is described as "contact" for convenience of explanation, actually, a gap is maintained between the two electrode films, and the electrode films are not electrically shortcircuited. The same is as follows.

When the bias voltage becomes Vb=7.5 V at next zone Zc, the voltage applied to the fixed electrode film 9 is set to Va1=7.5 V. Thereby, the voltage difference between the electrode films 7, 9 becomes DV=0, and the voltage difference between the electrode films 8, 10 becomes DV=7.5 V. Thereby, the electrostatic force is generated between the electrode films 8, 10, the electrode film 7 is separated from the electrode film 9 by adding a repulsive force by elastically deforming the electrode film 7 at zone Zb to the electrostatic force, and the movable mirror 2 starts rotating in the clockwise direction.

When the bias voltage becomes Vb=24 V at next zone Zd, the voltage difference between the electrode films 7, 9 becomes DV=16.5 V, the voltage difference between the electrode films 8, 10 becomes DV=24 V, the electrostatic force operated between the electrode films 8, 10 is further intensified, and the movable mirror 2 is rotated further in the clockwise direction.

At final zone Ze, the electrode film 7 of the movable mirror 2 collides with the address electrode film 10. At this occasion, the voltage applied to the address electrode film 9 is set to Va1=5 V. The movable mirror 2 is vibrated as shown by a Crossover curve of FIG. 25, and gradually attenuated to be brought into a stable state to thereby finish operation of being inclined to the opposed side.

When the movable mirror 2 is brought into a state of the right side (stay side) of FIG. 24, as shown by an upper stage on the right side in the frame of FIG. 24, the voltage applied to the fixed electrode film 9 is set to Va1=0 V (zone Za). At next zone of Zb, when the bias voltage becomes Vb=−26 V, the voltage applied to the fixed electrode film 10 on the opposed side is set to Va2=7.5 V, and at next zone Zc, the bias voltage becomes Vb=7.5 V.

At this occasion, as shown by a dotted line circle mark CH in FIG. 25, the electrode film 7 is temporarily separated from the electrode film 9, when the bias voltage becomes Vb=24 V at zone Zd, the electrode film 7 is brought into contact with the electrode film 9 again, thereafter, at zone Ze, the voltage applied to the electrode film 10 is set to Va2=5 V, and a state of inclining the movable mirror 2 is maintained in a state of being inclined to the left side. At this occasion, the movable mirror 2 is vibrated as shown by a Stay curve (one-dotted chain line curve) of FIG. 25 by bringing the electrode film 7 and the electrode film 9 into contact with each other, gradually attenuated to be brought into a stable state.

Meanwhile, according to the driving method of JP-A-10-48543, the movable mirror is displaced by operating an external force of the electrostatic force or the like thereto while finely controlling the bias voltage and the address voltages and therefore, the driving circuit and the driving method become complicated. Further, the bias voltage and the address voltages are continued to be applied over an entire time period of a transition time period and a time period of maintaining a displaced state of the movable mirror and therefore, not only power consumption is increased but also a burden on the driving circuit is considerable. Further, vibration is generated at the movable mirror in a final transition time period and therefore, an awaiting time period needs to be provided until the vibration is attenuated and stabilized. In a case in which operation of the movable mirror becomes unstable when the movable mirror is shifted to next operation (displacing operation) during the awaiting time period and therefore, operation at a high speed cycle is restricted.

SUMMARY OF THE INVENTION

An object of an illustrative, non-limiting embodiment of the invention is to provide a method of driving a small electromechanical element and a small electromechanical element array which are accompanied by a low voltage and low power consumption and can be operated by a high speed cycle by preventing vibration of a movable mirror in a final transition period.

The above-described object can be achieved by following constitutions.

(1) A method of driving a small electromechanical element characterized in a method of driving a small electromechanical element, which includes: an elastic portion for accumulating an elastic energy by being deformed elastically; a movable portion supported by the elastic portion; and a drive source for exerting a physical acting force for maintaining the movable portion, for displacing the movable portion to any normal position in a plurality of normal positions constituting destinations of displacing the movable portion, wherein after accumulating an elastic energy (a first elastic energy) to the elastic portion by displacing the movable portion to one of the normal positions, by stopping the physical acting force from the drive source and releasing the elastic energy (the first elastic energy) accumulated to the elastic portion, the movable portion is displaced to one of the other of the normal positions while accumulating again an elastic energy (a second elastic energy) having a polarity reverse to a polarity of the preceding elastic energy (the first elastic energy) to the elastic portion, repeatedly.

According to the method of driving a small electromechanical element, after accumulating an elastic energy to the elastic portion by displacing the movable portion to one of the normal positions, the elastic energy is released by stopping the physical acting force from the drive source, thereby, the movable portion is displaced to other of the normal positions while accumulating again an elastic energy to the elastic portion and therefore, the movable portion is displaced only by the elastic energy accumulated to the elastic portion without depending on the physical acting force from outside. Therefore, the small electromechanical element can be driven by low power consumption.

(2) The method of driving a small electromechanical element according to (1), characterized in including maintaining the elastic energy by the physical acting force of the driving source after the displacing of the movable portion to each of the normal positions. That is, the method includes: in displacing the movable portion to any of the normal positions, a stage of accumulating an elastic energy to the elastic portion by displacing the movable portion to one of the normal positions; a stage of maintaining the elastic energy accumulated to the elastic portion by the physical acting force of the drive source; a stage of displacing the movable portion by releasing the elastic energy; and a stage of maintaining an elastic energy accumulated again to the elastic portion by the physical acting force of the drive source.

According to the method of driving a small electromechanical element, the movable portion is maintained by the physical acting force of the drive source in a state of accumulating an elastic energy to the elastic portion by being displace to one of the normal positions, successively, the movable portion is displaced to other of the normal positions to be maintained again by the physical acting force of the drive source while accumulating again an elastic energy to the elastic portion by releasing the elastic energy and therefore, the movable portion is displaced by the accumulated elastic energy. Therefore, when the movable portion is finished to be displaced from one of the normal positions to other of the normal positions, there is not an inertia energy provided to the movable portion, and the movable portion is not impacted to the fixed portion. Thereby, the small electromechanical element can be operated by a high speed cycle by preventing the movable portion from being vibrated in displacing the movable portion. Further, the physical acting force from the drive source may be operated when the movable portion is maintained, the movable portion can be driven by a low voltage, further, a reduction in power consumption can be achieved.

(3) A method of driving a small electromechanical element characterized in a method of driving a small electromechanical element, which includes: an elastic portion for accumulating an elastic energy by being deformed elastically; a movable portion supported by the elastic portion; and a drive source for exerting a physical acting force for maintaining the movable portion, for displacing the movable portion to any normal position in a plurality of normal positions constituting destinations of displacing the movable portion, wherein after accumulating an elastic energy to the elastic portion by displacing the movable portion to one of the normal positions, by releasing the elastic energy accumulated to the elastic portion and exerting the physical acting force from the drive source after exceeding substantially a half of a total amount of displacing the movable portion, the movable portion is displaced to other of the normal positions.

According to the method of driving a small electromechanical element, when the movable portion is displaced by releasing an elastic energy accumulated to the elastic portion, the movable portion is displaced to other of the normal positions by exerting the physical acting force from the drive source after exceeding substantially the half of the total amount of displacing the movable portion and therefore, the movable portion can accurately be displaced to other of the normal positions without wastefully accelerating the movable portion. Thereby, the small electromechanical element can stably be operated.

(4) The method of driving a small electromechanical element according to any one of (1) through (3), characterized in that in releasing the elastic energy, a preliminary physical acting force for compensating for attenuating an operation of the movable portion is exerted.

According to the method of driving a small electromechanical element, the preliminary physical acting force for compensating for attenuating the operation of the movable portion and therefore, even when the movable portion cannot be displaced to other of the normal positions only by the accumulated elastic energy by attenuating a displacement of the movable portion, the movable portion can firmly be displaced by exerting the preliminary physical acting force and the highly reliable small electromechanical element is provided.

(5) The method of driving a small electromechanical element according to any one of (1) through (4), characterized in that the physical acting force is an electrostatic force.

According to the method of driving a small electromechanical element, the movable portion is displaced by the electrostatic force and therefore, power can be saved, and the small electromechanical element can be operated by a high speed cycle.

(6) The method of driving a small electromechanical element according to any one of (1) through (4), characterized in that the physical acting force is an electromagnetic force.

According to the method of driving a small electromechanical element, the movable portion is displaced by the electromagnetic force and therefore, the movable portion can firmly be displaced by an inexpensive and simple control.

(7) A small electromechanical element array characterized in that the small electromechanical element array is constituted by being arranged with a plurality of small electromechanical elements, each including: an elastic portion for accumulating an elastic energy by being deformed elastically; a movable portion supported by the elastic portion a drive source for exerting a physical acting force for maintaining the movable portion, and that the small electromechanical element array further includes a control portion for driving the small electromechanical elements based on a method of driving a small electromechanical element according to any one of (1) through (6).

According to the small electromechanical element array constituted in this way, the small electromechanical element array arranged with a plurality of small electromechanical elements is driven by the control portion based on the driving method according to any one of (1) through (6) and therefore, the respective small electromechanical elements can be prevented from being vibrated, and the small electromechanical element array can be operated by a high speed cycle and with lower power consumption.

(8) An image forming apparatus characterized in including a light source, a small electromechanical element array according to (7), an optical system for irradiating light from the light source to the small electromechanical element array, and a projecting optical system for projecting light emitted from the optical system to an image forming face.

According to the image forming apparatus constituted in this way, an image is formed by projecting light from the light source irradiated to the small electromechanical element array to the image forming face and therefore, a clean image can be displayed at high speed.

According to an aspect of a method of driving a small electromechanical element of the invention and an aspect of a small electromechanical element array of the invention, the movable portion of the small electromechanical element can be displaced without being vibrated and by low voltage and low power consumption, thereby, can be operated by a high speed cycle.

BRIEF DESCRIPTION OF THE DRAWINGS

FIG. 1A is a perspective view and FIG. 1B is a vertical sectional view.

FIG. 2 illustrates a conceptual view showing a procedure of operating the small electromechanical element.

FIG. 4A shows a balance state, FIG. 4B shows a pivoting start state, FIG. 4C shows a state of increasing pivoting, and FIG. 4D shows a state of being displaced to one normal position.

FIG. 5 is a timing chart diagram of the operation procedure shown in FIGS. 4A to 4D.

FIG. 6 is an explanatory diagram showing a correlation between a displacing amount and a drive voltage operated to a movable portion when operation of the movable portion is not attenuated.

FIG. 7 is an explanatory diagram showing a correlation between the displacing amount and the drive voltage operated to the movable portion when operation of the movable portion is attenuated.

FIG. 10A is a sectional view showing a state of displacing a movable portion to one normal position and FIG. 10B is a sectional view showing a state of displacing the movable portion to other normal position.

FIG. 12A is a plane view showing a state of displacing a movable portion to one normal position and FIG. 12B is a plane view showing a state of displacing the movable portion to other normal position.

FIG. 14A is a sectional view showing a state of displacing a movable portion to one normal position and FIG. 14B is a sectional view showing a state of displacing the movable portion to other normal position.

DETAILED DESCRIPTION OF THE INVENTION

A detailed explanation will be given of exemplary embodiments of a method of driving a small electromechanical element and a small electromechanical element array according to the invention in reference to the drawings as follows.

First Embodiment

An explanation will be given here by using a rotation type small electromechanical element of an electrostatic array driven type as an example of a small electromechanical element.

Figure 1A:
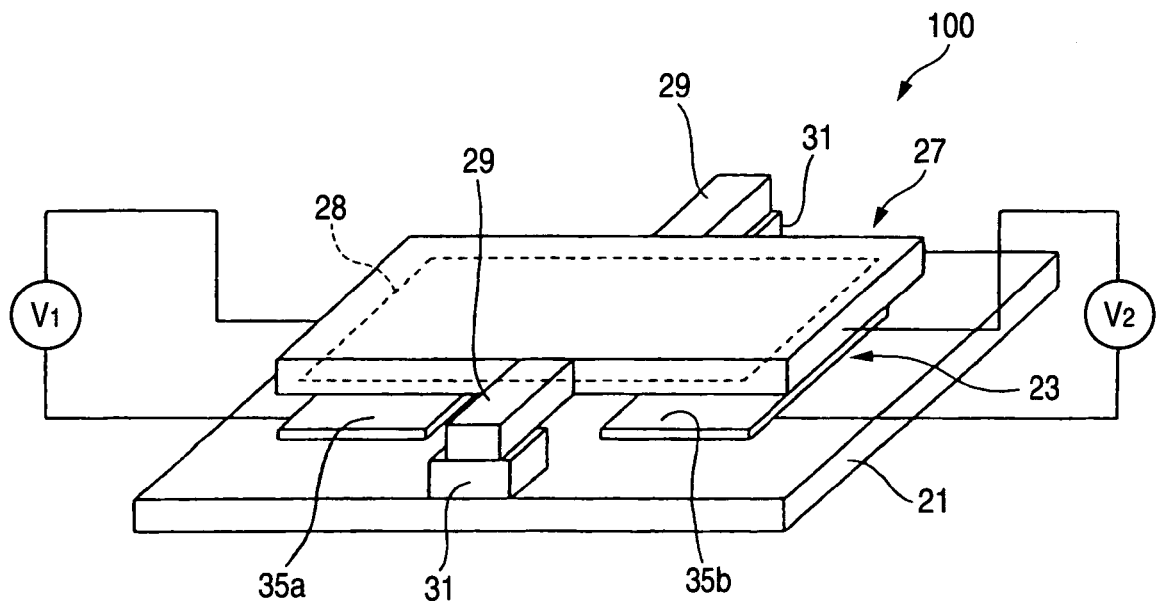
FIGS. 1A and 1B illustrate conceptual views of a first exemplary embodiment of a small electromechanical element according to the invention.
Figure 1B:
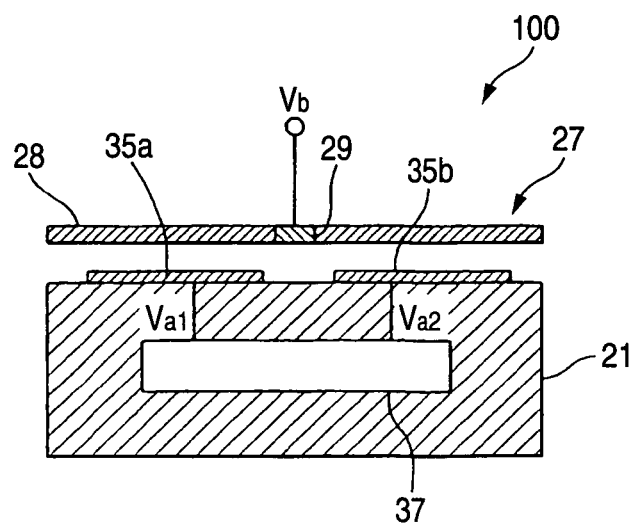

FIGS. 1A and 1B illustrate conceptual views of a first exemplary embodiment of a small electromechanical element according to the invention, FIG. 1A is a perspective view of the small electromechanical element, FIG. 1B is a vertical sectional view thereof.

As shown by FIGS. 1A and 1B, a small electromechanical element 100 according to the embodiment includes a board 21, a movable portion 27 in a shape of a small piece arranged in parallel with the board 21 by way of a gap 23, hinges 29, 29 constituting support portions extended from both edge portions of the movable portion 27, and spacers 31, 31 for supporting the movable portion 27 by the board 21 by way of the hinges 29, 29 as a basic constitution elements. By such a constitution, the movable portion 27 can rotationally be displaced by twisting the hinges 29, 29.

According to the small electromechanical element 100, an upper face of the movable portion 27 constitutes a light reflecting portion (micromirror portion). Otherwise, a small electromechanical element according to the invention can be made to be functioned as a light modulating switch, a light switching switch, an electric switch by pertinently selecting a material of the movable portion 27, or attaching a shortcircuit contact or the like. Further, the small electromechanical element 100 can switch a sound wave, a fluid, a heat ray, or switch of an RF signal.

According to the embodiment, in reaching a final position of a displacement in a specific direction, the movable portion 27 is brought into contact with the board 21 or a stopping member, not illustrated, to be stopped thereby. That is, the small electromechanical element of a contact type is constituted.

An upper face of the board 21 is provided with a first address electrode 35a and a second address electrode 35b constituting fixed electrodes on both sides thereof centering on the hinges 29, 29. Further, also the movable portion 27 is provided with a movable electrode, not illustrated, at a portion thereof. The small electromechanical element 100 is provided with a drive circuit 37 at inside of the board 21, the drive circuit 37 applies voltages between the movable portion 27 (movable electrode 28) and the first address electrode 35a and between the movable portion 27 (movable electrode 28) and the second address electrode 35b.

The small electromechanical element 100 pivots to displace the movable portion 27 by constituting a center of twist by the hinges 29, 29 by applying voltages Va1, Va2, Vb to the first address electrode 35a, the second address electrode 35b, the movable portion 27 as basic operation. That is, the movable portion 27 constitutes a micromirror portion and therefore, a direction of reflecting light is switched.

According to the small electromechanical element 100, when a potential differences (Va1–Vb, Va2–Vb) are provided to the first address electrode 35a, the second address electrode 35b relative to the movable portion 27, electrostatic forces are generated between the respective electrodes and the movable portion 27 and a rotational torque is operated centering on the hinges 29, 29. The electrostatic force generated at this occasion depends on a space permittivity, an area of the movable portion 27, an applied voltage, and intervals between the movable portion 27 and the address electrodes 35a, 35b.

Therefore, when the space permittivity, the area of the movable portion 27, the intervals between the movable portion 27 and the first address electrodes 35a, 35b, and an elastic coefficient of the hinges 29, 29 are constant, the movable portion 27 can bidirectionally be displaced to rotate by controlling potentials of the respective electrodes. When a potential difference between the movable portion 27 and the first address electrode 35a is designated by V1 (Va1–Vb) and the potential difference between the movable portion 27 and the second address electrode 35b is designated by V2 (Va2–Vb), for example, when V1>V2, the electrostatic force generated between the first address electrode 35a and the movable portion 27 becomes larger than the electrostatic force generated between the second address electrode 35b and the movable portion 27 and the movable portion 27 is inclined to the left side. Conversely, when V1<V2, the electrostatic force generated between the second address electrode 35b and the movable portion 27 becomes larger than the electrostatic force generated between the first address electrode 35a and the movable portion 27, and the movable portion 27 is inclined to a right side.

In this way, the movable electrode 28 of the movable portion 27, the first address electrode 35a, the second address electrode 35b constitute a drive source for rotationally displacing the movable portion 27. By constituting a physical acting force applied from the drive source to the movable portion 27 by the electrostatic force, high speed rotational displacement can be carried out.

Further, the physical acting force operated to the movable portion 27 may be a physical acting force other than the electrostatic force. As other physical acting force, for example, a piezoelectric effect or an electromagnetic force can be pointed out. In this case, as a drive source, a piezoelectric actuator using a piezoelectric element, or an electromagnetic actuator using a magnet and a coil is adopted.

In this way, the small electromechanical element 100 includes the movable portion 27 displaced bidirectionally and the movable portion 27 is provided with a switching function. The movable portion 27 is rotated to displace against a gravitational force, an elastic force of the hinges 29, 29 by a plurality of drive sources (movable electrode 28 of movable portion 27, first address electrode 35a, second address electrode 35b) for exerting a physical acting force. The small electromechanical element 100 according to the embodiment is operated with the electrostatic force as the physical acting force.

Figure 3:
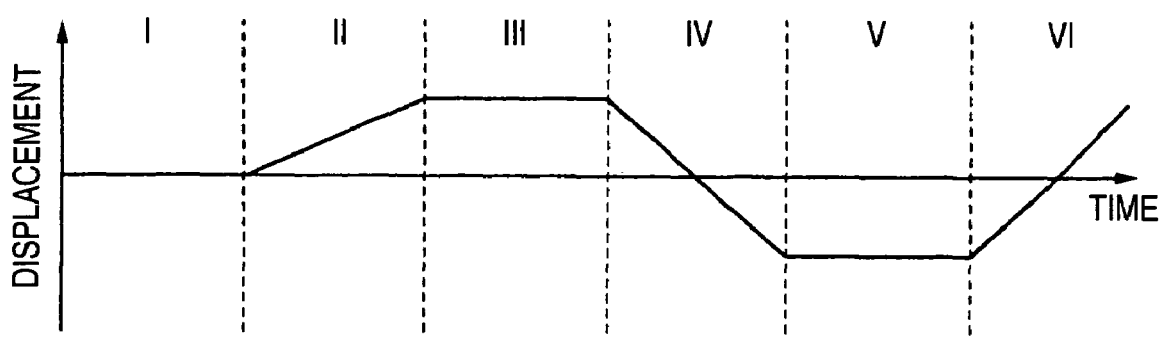
FIG. 3 is a timing chart diagram of the operation procedure shown in FIG. 2.

Next, a general explanation will be given of operation of the small electromechanical element 100 according to the invention in reference to FIG. 2 and FIG. 3. FIG. 2 illustrates conceptual views showing an operating procedure of the small electromechanical element, and FIG. 3 is a timing chart of the operating procedure shown in FIG. 2.

In state I in which a voltage is not applied from the drive source, the movable portion 27 is disposed at an equal distance (balance state) from the first address electrode 35a and the second address electrode 35b and an elastic energy provided by the hinges 29, 29 is null. Here, a force is exerted to the movable portion from outside (arrow mark A direction) by pertinent means, mentioned later, and the movable portion 27 is inclined to the left by twisting the hinges 29, 29 in the counterclockwise direction against an elastic force thereof (state II), the hinges 29, 29 are accumulated with an elastic energy of an amount proportional to a twist angle. Further, in state III, by providing a potential difference V1 larger than the elastic energy accumulated in the hinges 29, 29 between the movable portion 27 and the first address electrode 35a, the movable portion 27 is maintained in a state of being inclined to the left.

Here, as shown by state IV, when the elastic energy accumulated in the hinges 29, 29 is released by removing the potential difference V1 between the movable portion 27 and the first address electrode 35a, the movable portion 27 is started to be pivoted in the clockwise direction (arrow mark B direction). Finally, when the movable portion 27 becomes in parallel with the board 21 (state I), the elastic energy accumulated in the hinges 29, 29 becomes null, however, the movable portion 27 is rotated further in the clockwise direction by inertia and is inclined to the right while further accumulating an elastic energy of a polarity reverse to that of state II to the hinges 29, 29 and becomes proximate to the second address electrode 35b.

Here, when a potential difference V2 for generating an electrostatic force larger than the elastic energy accumulated in the hinges 29, 29 is provided between the movable portion 27 and the second address electrode 35b, the movable portion 27 is maintained again in a state of being inclined to the right. Thereafter, similar operation is repeatedly carried out at each time of releasing and applying the potential differences V1, V2. Further, the elastic energy having the reverse polarity refers to an elastic energy for urging to rotate the movable portion 27 in the reverse direction.

In other words, after inclining the movable portion 27 forcibly to one side once at an initial stage of operation, the movable portion 27 can be displaced to be switched by an arbitrary timing only by supplying a small power necessary for maintaining the movable portion 27 in the inclined state, or removing the power.

Although the general operation of the movable portion is as described above, a further detailed explanation will be given thereof in reference to FIG. 4A through FIG. 6.

Figure 4A:
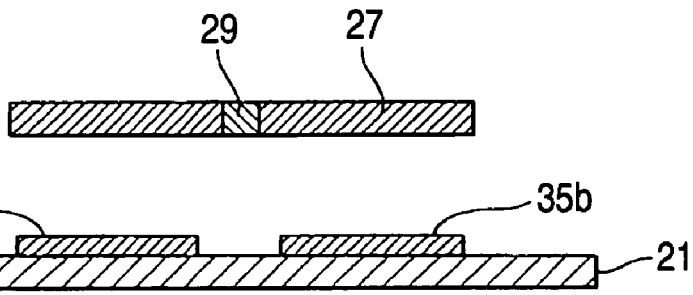
FIGS. 4A to 4D illustrate conceptual views showing an operation procedure of displacing a movable portion to one normal position at an initial stage of operating a small electromechanical element.
Figure 4B:
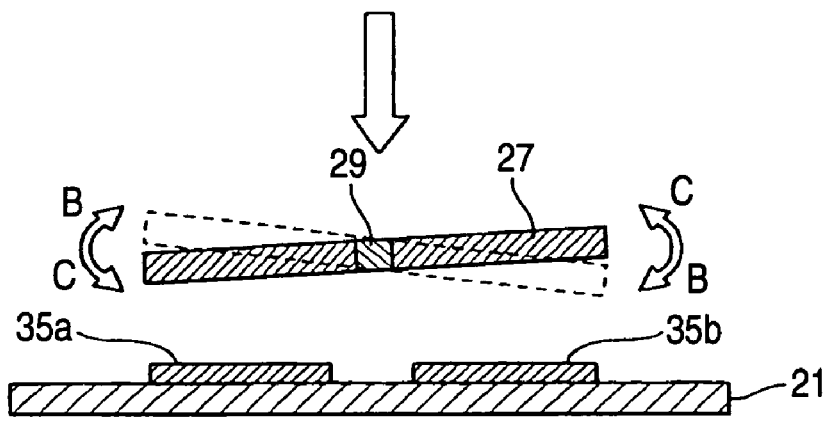
Figure 4C:
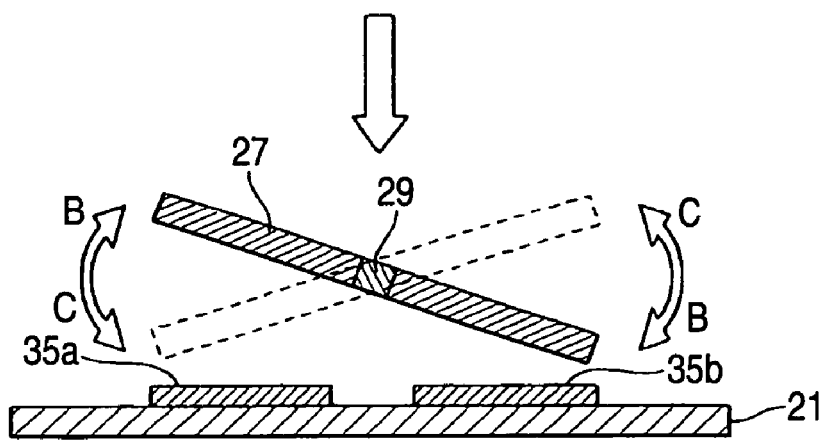
Figure 4D:
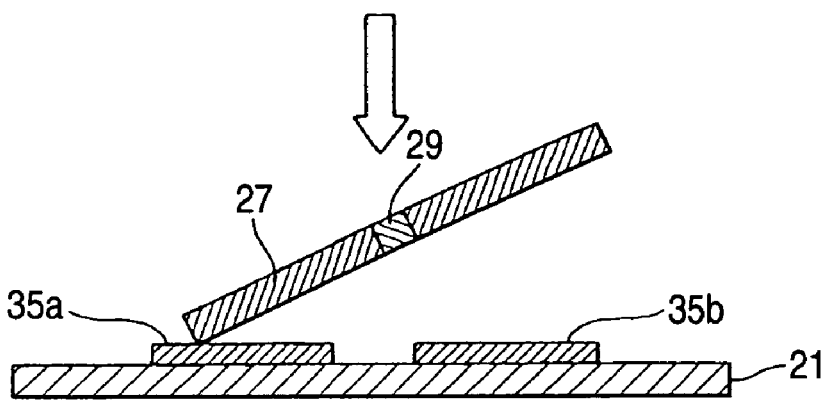

FIGS. 4A to 4D illustrate conceptual views showing operational procedure of displacing the movable portion to one normal position at an initial stage of operation of the small electromechanical element, FIG. 4A is the conceptual view of the balance state, FIG. 4B is a conceptual view of a pivoting start state, FIG. 4C is the conceptual view of a state of increasing a pivoting movement, FIG. 4D is a conceptual view of a state of being displaced to one normal position, FIG. 5 is a timing chart of an operational procedure shown in FIGS. 4A to 4D, FIG. 6 is an explanatory diagram showing a correlation between a displacing amount and a drive voltage operated to the movable portion when operation of the movable portion is not attenuated.

A procedure of accumulating the elastic energy to the hinges 29, 29 by forcibly displacing the movable portion 27 from state I to state II shown in FIG. 2 and FIG. 3 can be carried out by operating the electrostatic force to the movable portion 27 by alternately applying voltages to the first address electrode 35a and the second address electrode 35b. That is, as shown by FIG. 5, it is repeatedly carried out to apply a voltage V1 between the first address electrode 35a and the movable electrode 28 for a short time period, thereafter, apply a voltage V2 between the second address electrode 35b and the movable electrode 28 for a short time period by a constant frequency f.

Thereby, the movable portion 27 brought into a balance state shown in FIG. 4A is operated with a physical acting force (electrostatic force) alternately in an arrow mark B or C direction to start pivoting centering on the hinges 29, 29 (FIG. 4B), further pivoted considerably with an elapse of time (FIG. 4C), and is finally displaced to one normal position by being attracted to a side of the board 21 against a gravitational force, the elastic force of the hinges 29, 29 (FIG. 4D). Thereby, the hinges 29, 29 are accumulated with the elastic energy of an amount proportional to a rotational angle.

A state of adsorbing (pulling) a front end of the movable portion 27 to the board 21 is referred to as pull-in. That is, the movable portion 27 is displaced by an electrostatic force generated by a pull-in voltage applied to the movable electrode 28, the first electrode 35a, the second address electrode 35b. The movable portion 27 pulled in to the side of the first electrode 35a is maintained in a pull-in state (state shown in FIG. 4D) by applying a pull-out voltage of a voltage lower than the pull-in voltage to the first address electrode 35a (refer to FIG. 5).

Further, by making a frequency f of applying the voltages V1, V2 the same as a natural frequency of the movable portion 27, the movable portion 27 can easily be pivoted to be displaced to the one normal position by smaller energy, which is preferable.

Here, the pull-in voltage can be classified to a static pull-in voltage and a dynamic pull-in voltage. When the electrostatic force is not operated, the movable portion 27 is brought into the balance state. When the electrostatic force is operated thereto and an electrostatic torque T1 is smaller than a torque Tm of twisting the hinges 29, 29 (Tm>T1), although the movable portion 27 is inclined, the movable portion 27 is not adsorbed thereto. On the other hand, at an instance at which the electrostatic torque T1 exceeds the twist torque Tm (Tm<T1), the movable portion 27 is brought into the pull-in state of being adsorbed to the board 21. The voltage at this occasion constitutes the static pull-in voltage.

Therefore, when the static pull-in voltage is applied, the torque Tm of twisting the hinges 29, 29 overcomes the static torque T1 and the movable portion 27 is pulled to the side of the board 21. Therefore, it is not necessary to apply a voltage larger than the static pull-in voltage, when an excessive voltage exceeding the static pull-in voltage is applied, a reactive force when the movable portion 27 is impacted to the side of the board 21 is increased and the vibration is increased.

Further, in a case of pivoting the movable portion 27, when a sum of the electrostatic torque T1 and an inertia force Tk of the movable portion 27 is smaller than the torque Tm of twisting the hinges 29, 29 (Tm>T1+Tk) although the movable portion 27 is inclined, the movable portion is not adsorbed thereto. On the other hand, at an instance at which the sum of the electrostatic torque T1 and the inertia force Tk exceeds the twisted torque Tm (Tm<T1+Tk), the movable portion 27 is brought into the pull-in state of being adsorbed to the board 21. A voltage at this occasion becomes a dynamic pull-in voltage.

Further, means for displacing the movable portion 27 from the balance state to the one normal position is not limited to the above-described electrostatic force but arbitrary means of an electromagnetic force by an electromagnet or the like, a piezoelectric force by a piezoelectric element, mechanical means or the like can be adopted. Further, the procedure of accumulating the elastic energy to the hinges 29, 29 by displacing the movable portion 27 may be carried out at either timing after immediately supplying a power source to the small electromechanical element 100, or immediately before operating the small electromechanical element 100. In either of the cases, the elastic energy is accumulated to the hinges 29, 29 before operating the small electromechanical element 100.

An explanation will be given by dividing the explanation to two cases of a case in which a displacement of the movable portion is not attenuated and a case in which the displacement is attenuated in switching the movable portion 27 in which the hinges 29, 29 are accumulated with the elastic energy as described above to other normal position.

First, a detailed explanation will be given of the case in which the displacement of the movable portion is not attenuated in reference to FIG. 6.

FIG. 6 shows a relationship between the displacing amount and the drive voltage of the movable portion. As shown by FIG. 6, in state III (refer to FIG. 2), the drive voltage (potential difference) is applied between the first address electrode 35a and the movable electrode 28, the movable portion 27 is maintained in a state of being inclined to the left side at one normal position Y1. Here, when the drive voltage V1 is removed, the movable portion 27 starts rotating in the clockwise direction by operation of the elastic energy accumulated to the hinges 29, 29 (refer to state IV of FIG. 2).

When the movable portion 27 becomes in parallel with the board 21 (state I of FIG. 2), although the accumulated elastic energy is consumed to be nullified, the movable portion 27 is rotated further in the clockwise direction by inertia to be inclined to the right side while accumulating again the elastic energy having the polarity reverse to that of state II to the hinges 29, 29 and is proximate to the second address electrode 35b. Further, during a time period Ta until the movable portion 27 is inclined to the right to be proximate to the second address electrode 35b after removing the drive voltage V1, there is not a force operated from outside and the movable portion 27 is displaced only by the elastic energy accumulated to the hinges 29, 29.

When the movable portion 27 reaches other normal position Y2, the movable portion 27 does not come into such contact with the stopping member that the vibration is generated as a reaction of the contact, since the movable portion 27 is not provided with an inertia force (inertia energy). Therefore, a vibration is hampered from being brought about. Here, when the drive voltage (potential difference) V2 is applied between the second address electrode 35b and the movable electrode 28, the movable portion 27 is maintained in the state of being inclined to the right side by the electrostatic force without being vibrated (state V of FIG. 2).

Next, when the drive voltage V2 is removed, the movable portion 27 is rotated in the counterclockwise direction by operation of the elastic energy accumulated to the hinges 29, 29 to be inclined to the left side while accumulating again the elastic energy to be proximate to the first address electrode 35a. During a time period Tb until the movable portion 27 is inclined to the left and is proximate to the first address electrode 35a after removing the drive voltage V2, there is not a force operated from outside and the movable portion 27 is displaced only by the elastic energy accumulated to the hinges 29, 29.

When the movable portion 27 reaches the one normal position Y1 again, the movable portion 27 is not provided with the inertia force (inertia energy) and therefore, the vibration is not generated, when the drive voltage V1 is applied again between the first address 35a and the movable electrode 28, the movable portion 27 is maintained in the state of being inclined to the left by the electrostatic force without being vibrated (state III of FIG. 2). Thereafter, by removing or applying the drive voltages V1, V2 similarly, the movable portion 27 is displaced from the one normal position Y1 to the other normal position Y2, or from the other normal position Y2 to the one contact position point Y1 without being vibrated.

As described above, the movable portion 27 can be switched without generating a vibration and therefore, it is not necessary to provide an awaiting time period awaiting for attenuation of the vibration, and the movable portion 27 can be operated by a high speed cycle. Further, a power required for switching the movable portion 27 is only a small power for maintaining the movable portion 27 to the respective normal positions Y1, Y2 and power consumption can be reduced more than that of the method of driving the small electromechanical element of the background art.

Next, a detailed explanation will be given of a case in which the displacement of the movable portion is attenuated in reference to FIG. 7 and FIG. 8.

Figure 8:
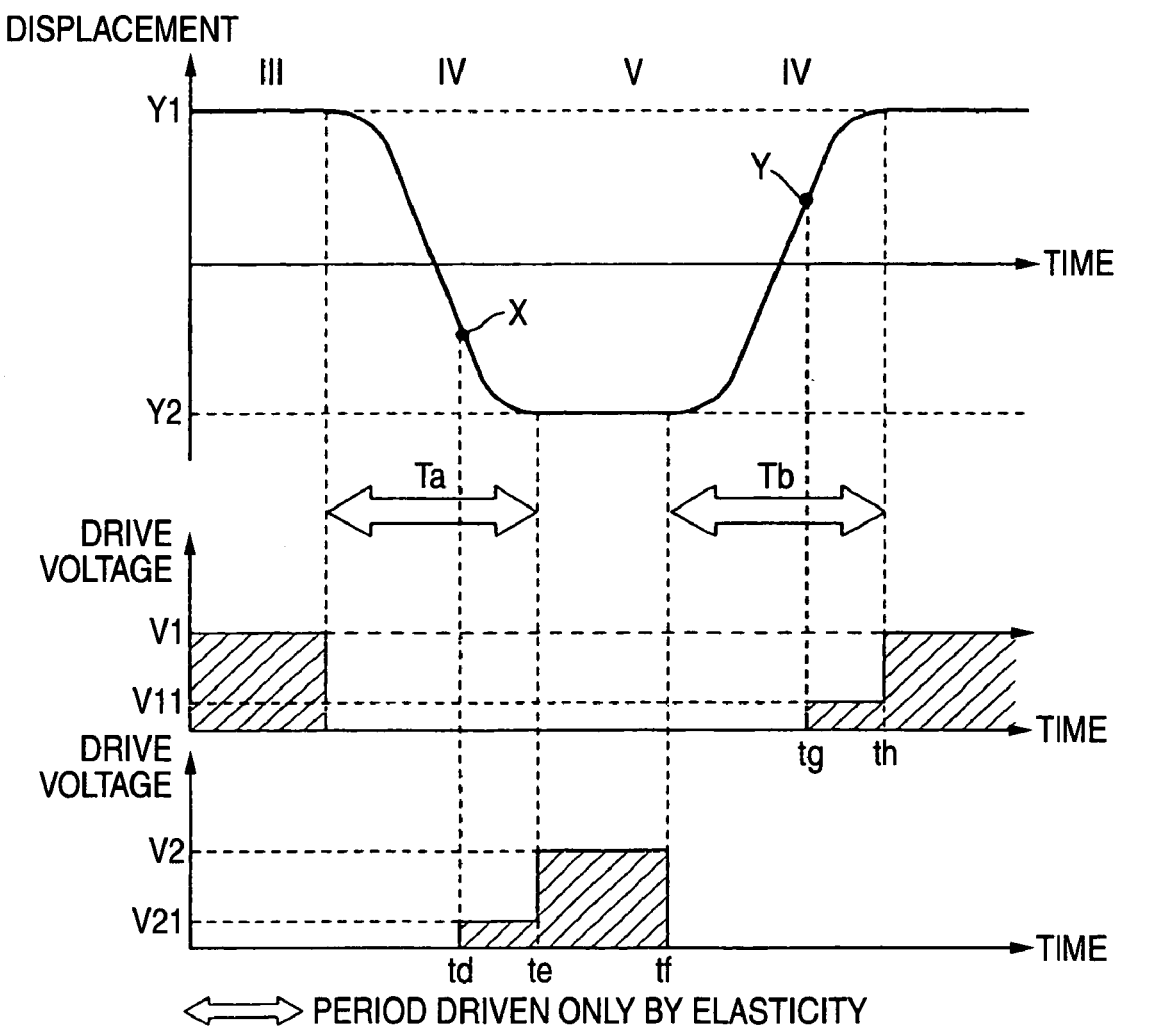
FIG. 8 is an explanatory diagram showing a correlation between the displacing amount and the drive voltage operated to the movable portion improving a driving method of FIG. 7.

FIG. 7 is an explanatory diagram showing a correlation between the displacing amount and the drive voltage operated to the movable portion when the operation of the movable portion is attenuated, and FIG. 8 is an explanatory diagram showing the correlation between the displacing amount and the drive voltage operated to the movable portion improving the driving method of FIG. 7. Further, timing charts shown in FIG. 7 and FIG. 8 are similar to the timing chart shown in FIG. 6 except that the amount of displacing the movable portion is attenuated and therefore, the same portions are attached with the same notations and an explanation thereof will be simplified or omitted.

As shown by FIG. 7, when the drive voltage V1 is removed in state III, the movable portion 27 is rotated in the clockwise direction by operation of the elastic energy accumulated to the hinges 29, 29 (state IV). At this occasion, since the amount of displacing the movable portion 27 is attenuated, at a point X (time ta) before the movable portion 27 reaches the other normal position Y2, the movable portion 27 is stopped since there is not an inertia force of the movable portion 27 and is going to be operated in the counterclockwise direction.

Here, when the drive voltage V2 is applied between the second address electrode 35b and the movable electrode 28 to maintain the movable portion 27 at the other normal position Y2, the movable portion 27 is attracted to the side of the second address electrode 35b by the electrostatic force to further rotate in the clockwise direction, brought into the stopping member, not illustrated, to be stopped thereby. At this occasion, the electrostatic force is operated to the movable portion 27 and therefore, the vibration is generated although the vibration is weaker than that in the driving method of the background art. The weak vibration of the movable portion 27 is finally attenuated and the movable portion 27 is maintained in the state of being inclined to the right side (state V). The attenuating time at this occasion is far shorter than that of the driving method of the background art.

Next, when the drive voltage V2 is removed, the movable portion 27 is rotated in the counterclockwise direction by operation of the elastic energy accumulated to the hinges 29, 29 to be proximate to the first address electrode 35a while accumulating the elastic energy. That is, during a time period from time ta at which the movable portion 27 reaches point X to time tb of removing the drive voltage V2, the drive voltage V2 is applied to the second address electrode 35b and the movable portion 27 is maintained in the state of being inclined to the right side.

Since the amount of displacing the movable portion 27 is attenuated, there is not the inertia force of the movable portion 27 at point Y (time tc) before reaching the one normal position Y1. Here, in order to maintain the movable portion 27 at the one normal position Y1, when the drive voltage V1 is applied between the first address electrode 35a and the movable electrode 28 at time tc at which the movable portion 27 reaches point Y, the movable portion 27 is attracted to the first address electrode 35a by the electrostatic force to be rotated further in the counterclockwise direction and is brought into contact with the stopping member, not illustrated, to be stopped thereby, and a weak vibration is brought about similar to the above-described also at this occasion.

In this way, the weak vibration generated at respective displacements to the normal positions Y1, Y2 constitutes a hazard in operating the small electromechanical element 100 by a higher speed cycle and therefore, the driving method is desired to be improved. An explanation will be given of the improved driving method in reference to FIG. 8. FIG. 8 shows a relationship between the displacing amount and the driving voltage of the movable portion when the movable portion is driven to exert a preliminary physical acting force for compensating for the attenuation with regard to the operation of the movable portion.

As shown by FIG. 8, when the drive voltage V1 is removed in state III in which the movable portion 27 is maintained in the state of being inclined to the left side, the movable portion 27 is rotated in the clockwise direction (state IV) and reaches point X at time td to nullify the inertia force of the movable portion 27. By compensating for the attenuation by applying a drive voltage V21 of a low voltage between the second address electrode 35b and the movable electrode 28 at the time td, the movable portion 27 is slowly attracted to the side of the second address electrode 35b by the weak electrostatic force and reaches the normal position Y2 at time te. The electrostatic force at this occasion is a weak force and therefore, a vibration is not brought about by bringing the movable portion 27 into contact with the stopping member strongly. Here, (time te), when the drive voltage V2 is applied between the second address electrode 35b and the movable electrode 28, the movable portion 27 is maintained in a state of being inclined to the right side (state V). In other words, the movable portion 27 is displaced from the one normal position Y1 to the other normal position Y2 without being vibrated.

When the drive voltage V2 is removed at time tf, the movable portion 27 is rotated in the counterclockwise direction by operation of the elastic energy accumulated to the hinges 29, 29 to be proximate to the first address electrode 35a while accumulating again the elastic energy and when point Y is reached at time tg, the inertia force of the movable portion 27 is nullified. Here, when the attenuation is compensated for by applying a drive voltage. V11 of a low voltage between the first address electrode 35a and the movable electrode 28, the movable portion 27 is slowly attracted to the side of the first address electrode 35a by a weak electrostatic force to reach again the one normal position Y1, however, since the electrostatic force is weak, the vibration is not brought about.

Further, at time th, the drive voltage V1 is applied between the first address electrode 35a and the movable electrode 28 and the movable portion 27 is maintained in the state of being inclined to the left side (in correspondence with state III). Thereafter, the operation is repeatedly carried out similarly.

As described above, according to the driving method of the embodiment, even when the operation of the movable portion is attenuated, the movable portion can be prevented from being vibrated by applying the preliminary physical acting force for compensating for the attenuation, that is, the drive voltage of the weak voltage as the preliminary physical acting force.

FIRST MODIFIED EXAMPLE

Figure 9:
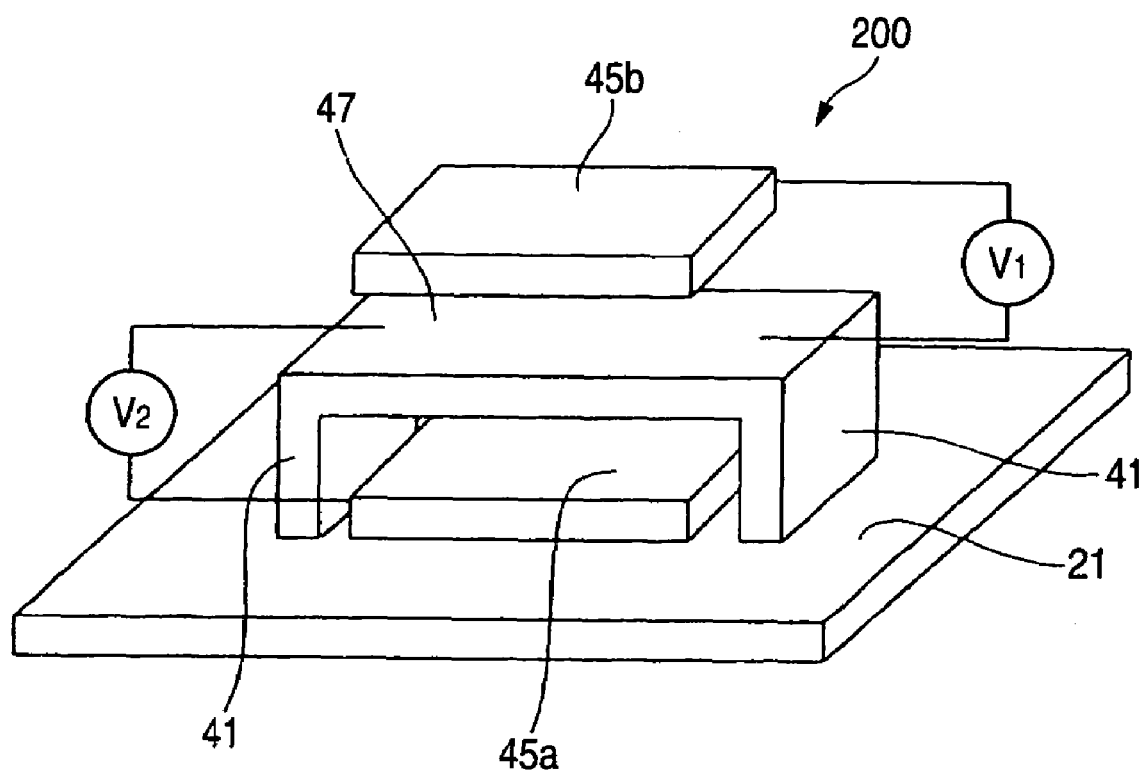
FIG. 9 is a conceptual view of a small electromechanical element of a parallel flat plate type relating to a first modified example of a small electromechanical element according to the first embodiment.

Next, an explanation will be given of a parallel flat plate type small electromechanical element of an electrostatic array driven type. FIG. 9 is a conceptual view of a parallel flat plate type small electromechanical element, FIGS. 10A and 10B shows states of operating the small electromechanical element, FIG. 10A is a sectional view showing a state of displacing a movable portion one normal position, FIG. 10B is a sectional view showing a state of displacing the movable portion to other normal position.

As shown by FIG. 9, according to a small electromechanical element 200 of a parallel flat plate type, a movable portion is supported in a hollow space above a board 21 by way of spacers 41, 41. There is constructed a constitution in which a first address electrode 45a is arranged at a position in correspondence with the movable portion 47 of the board 21, further, a second address electrode 45b is arranged on an opposed side interposing the movable portion 47.

Figure 10A:
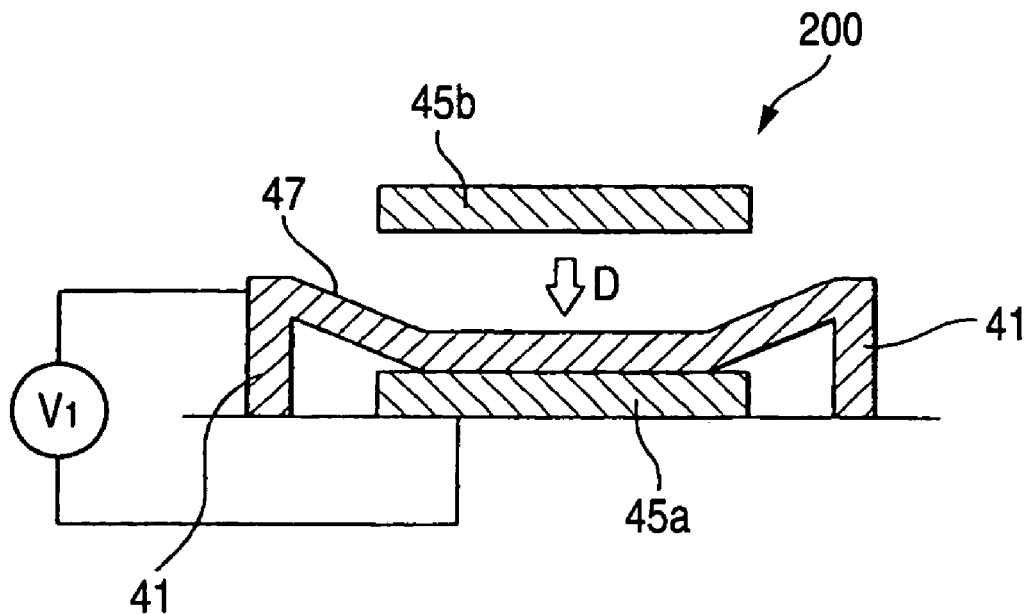
FIGS. 10A and 10B show states of operating the small electromechanical element of FIG. 9.
Figure 10B:
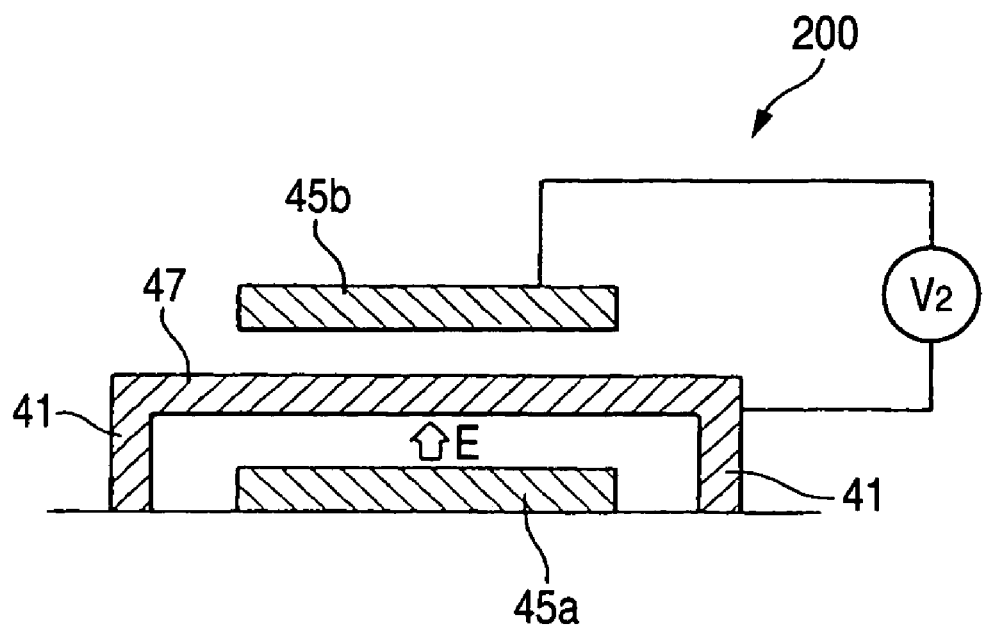

Further, as shown by FIG. 10A, when a drive voltage V1 is applied between the movable portion 47 and the first address electrode 45a, the movable portion 47 is displaced by being attracted to a side of the first address electrode 45a by an electrostatic force (arrow mark D direction), and is maintained at one normal position. Further, as shown by FIG. 10B, when a drive voltage V2 is applied between the movable portion 47 and the second address electrode 45b, the movable portion 47 is displaced to other normal position (arrow mark E direction) and is maintained. Although when the movable portion 47 reaches the normal position, there is a concern of being brought into contact with a stopping member to be vibrated thereby, by controlling the drive voltages V1, V2 similarly as has already been explained in reference to FIG. 6 or FIG. 8, the vibration can firmly be prevented from being brought about and the movable portion 47 can be driven by low power consumption.

SECOND MODIFIED EXAMPLE

Figure 11:
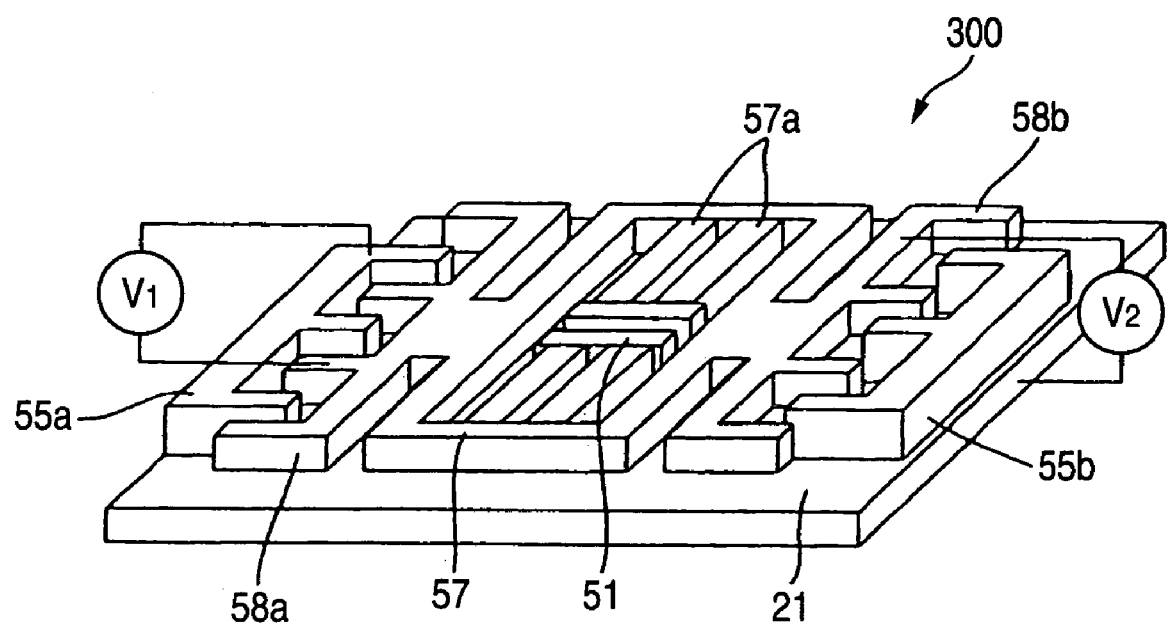
FIG. 11 is a conceptual view of a small electromechanical element of a comb drive type relating to a second modified example of the small electromechanical element according to the first embodiment.

Next, an explanation will be given of a comb drive type small electromechanical element of an electrostatically driven type in reference to FIG. 11 and FIGS. 12A and 12B. FIG. 11 is a conceptual view of a comb drive type small electromechanical element, FIGS. 12A and 12B shows states of operating the small electromechanical element, FIG. 12A is a plane view showing a state of displacing a movable portion to one normal position, FIG. 12B is a plane view showing a state of displacing the movable portion to other normal position.

As shown by FIG. 11, according to a small electromechanical element 300 of a comb drive type, a movable portion 57 in a shape of a rectangular frame is connected to a fixed member 51 formed on the board 21 displaceably by 4 pieces of flexible arms 57a. Left and right sides of the movable portion 57 are respectively formed with a first movable electrode 58a, and a second movable electrode 58b in a comb-like shape. A first address electrode 55a and a second address electrode 55b in a comb-like shape are fixedly installed above the board 21 respectively in correspondence with the first movable electrode 58a and the second movable electrode 58b. Further, there is constructed a constitution in which a drive voltage V1 is applied between the first movable electrode 58a and the first address electrode 55a, further, a drive voltage V2 is applied between the second movable electrode 55b and the second address electrode 55b.

Figure 12A:
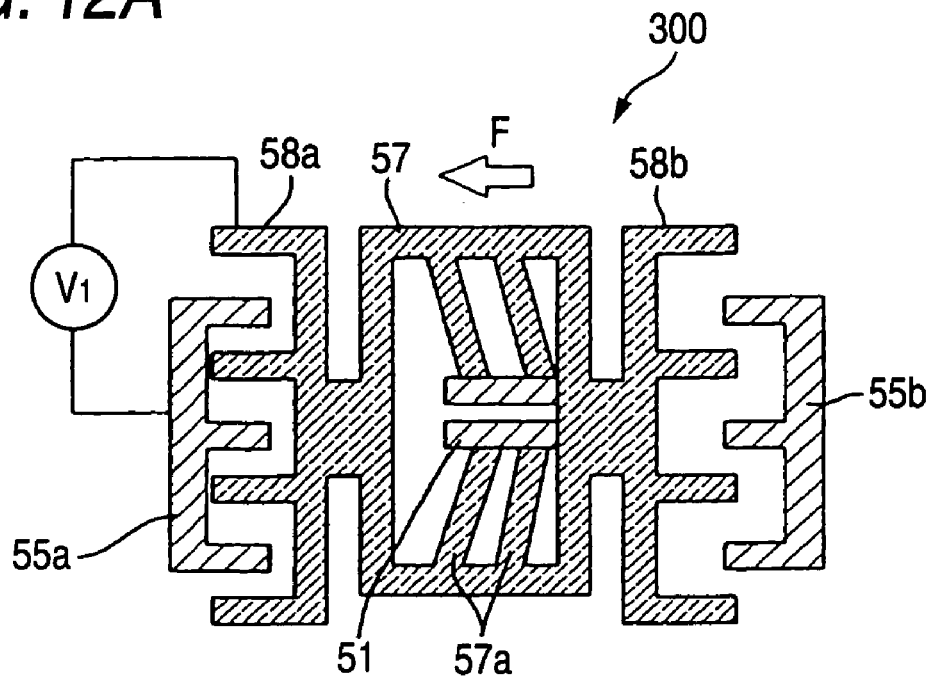
FIGS. 12A and 12B show states of operating the small electromechanical element of FIG. 11.
Figure 12B:
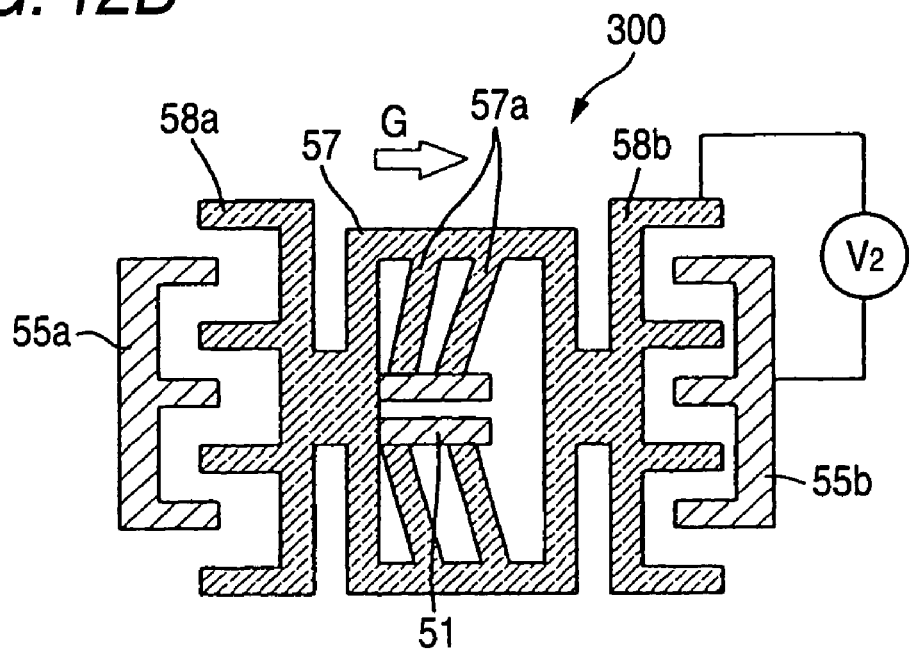

As shown by FIG. 12A, when the drive voltage V1 is applied between the first movable electrode 58a and the second address electrode 55a, the movable portion 57 is attracted to be displaced to a side of the first address electrode 55a (arrow mark F direction) by an electrostatic force and is maintained at one normal position. Further, as shown by FIG. 12B, when the drive voltage V2 is applied between the second movable electrode 58b and the second address electrode 55b, the movable portion 57 is attracted to be displaced to a side of the second address electrode 55b (arrow mark G direction) and is maintained at other normal position. Although when the movable portion 57 reaches the normal position, there is a concern that the movable portion 57 is brought into contact with a stopping member to be vibrated thereby, by controlling the drive voltages V1, V2 similarly by the method already explained in reference to FIG. 6 or FIG. 8, a vibration can firmly be prevented and the movable portion 57 can be driven by low power consumption.

Although in the above-described explanation, the same bias voltage is applied to the movable electrode, the address voltages are respectively applied to the address electrodes, conversely, the address voltage may be applied to the movable electrode, and the common bias voltage may be applied to the address electrodes. In this case, it is necessary to provide the movable electrode by dividing the movable electrode in two. Further, although in the above-described explanation, a waveform of a drive voltage for compensating for attenuation of an amount of displacing the movable portion is constituted by the rectangular wave, the waveform is not limited to the rectangular wave, for example, may be a sine wave, a triangular wave, a sawtooth wave or the like. Further, in displacing the movable portion, a weak voltage may normally be applied, further, can be applied once or dividedly by a plurality of times.

Second Embodiment

Figure 13:
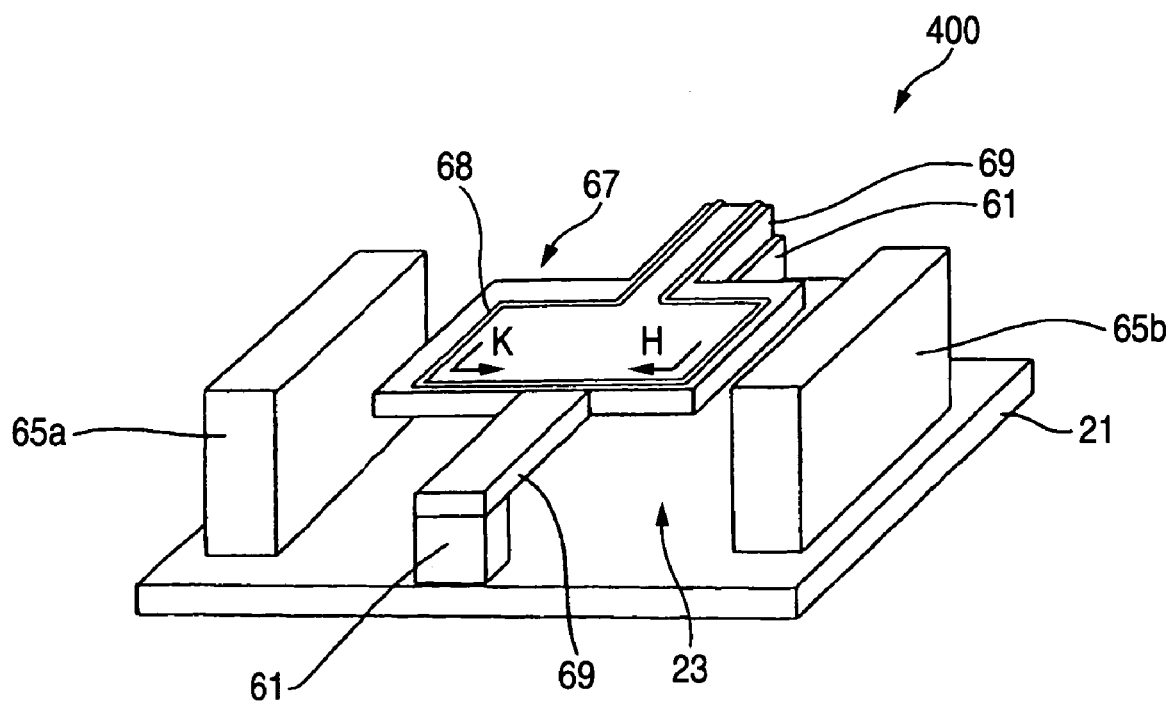
FIG. 13 is a conceptual view of a rotation type small electromechanical element of an electromagnetically driven type relating to a second exemplary embodiment of a small electromechanical element according to the invention.

An explanation will be given of a rotation type small electromechanical element of an electromagnetically driven type constituting other example of a small electromechanical element. FIG. 13 is a conceptual view of a rotation type small electromechanical element of an electromagnetically driven type.

As shown by FIG. 13, a rotation type small electromechanical element 400 of an electromagnetically driven type includes the board 21, a movable portion 67 in a shape of a small piece arranged in parallel with the board 21 by way of the gap 23, hinges 69, 69 constituting support portions extended from both edge portions of the movable portion 67, and spacers 61, 61 for supporting the movable portion 67 above a hollow space on the board 21 by way of the hinges 69, 69. The movable portion 67 can rotationally be displaced by twisting the hinges 69, 69. The movable portion 67 is integrally fixed with a coil 68 formed by a conductor of an electric wire or the like. Further, a pair of magnets 65a, 65b are arranged in correspondence with the movable portion 67 on two left and right sides by interposing the hinges 69, 69.

Operation of the small electromechanical element 400 will be explained.

Figure 14A:
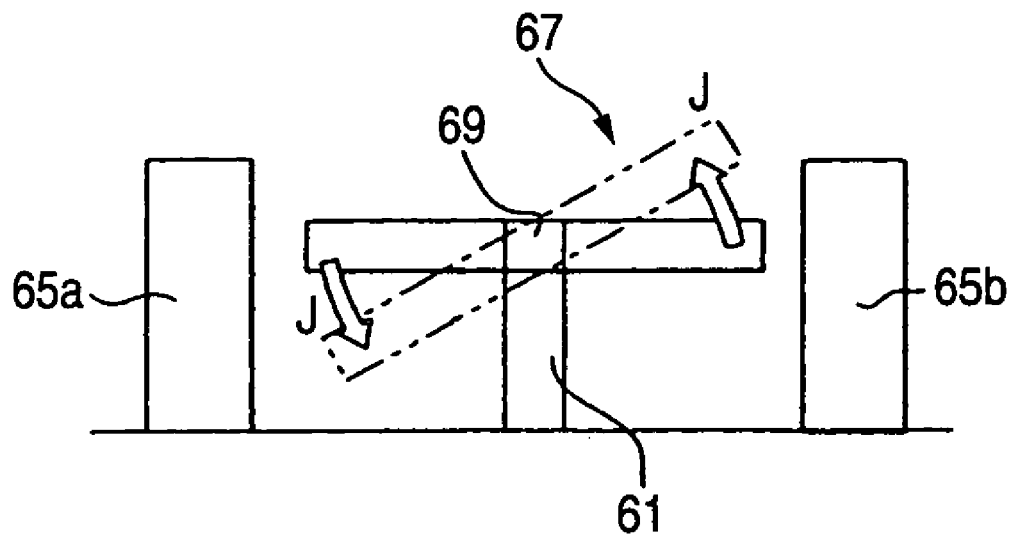
FIGS. 14A and 14B show states of operating the small electromechanical element of FIG. 13.
Figure 14B:
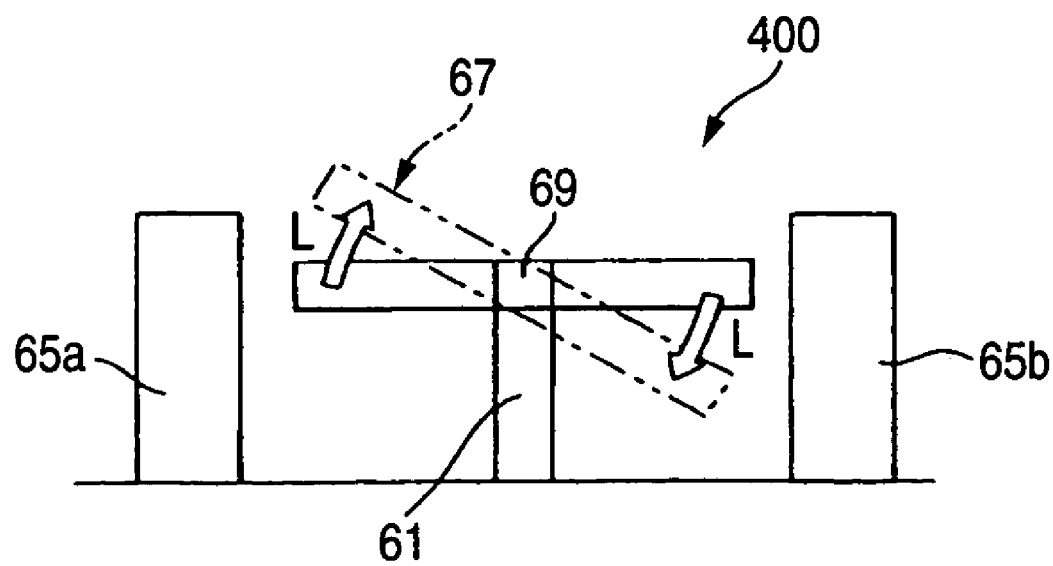

FIGS. 14A and 14B shows states of operating the small electromechanical element, FIG. 14A is a sectional view showing a state of displacing the movable portion to one normal position, FIG. 14B is a sectional view showing a state of displacing the movable portion to other normal position.

When a drive current i is made to flow to the coil 68, the movable portion 67 is rotationally displaced centering on the hinges 69, 69 in accordance with Fleming's left-hand rule. For example, when the drive current is made to flow in an arrow mark H direction as shown by FIG. 14A, the movable portion 67 is rotationally displaced in an arrow mark J direction, when the drive current i is made to flow in an arrow mark K direction, the movable portion 67 is rotationally displaced in an arrow mark L direction (refer to FIG. 14B). By the rotational displacement, the hinges 69, 69 are accumulated with elastic energy of a magnitude in accordance with an angle of rotating the movable portion 67.

An explanation will be given of a switching operation of the movable portion 67 with regard to two cases of a case in which an amount of displacing the movable portion is not attenuated and a case in which the amount is attenuated. Further, in order to simplify the explanation, the explanation will be given such that the movable portion 67 is displaced from a state indicated by a two-dotted chain line in FIGS. 14A and 14B where the movable portion 67 is maintained in a state of being inclined to a left side.

First, a detailed explanation will be given of a case in which the amount of displacing the movable portion is not attenuated.

Figure 15:
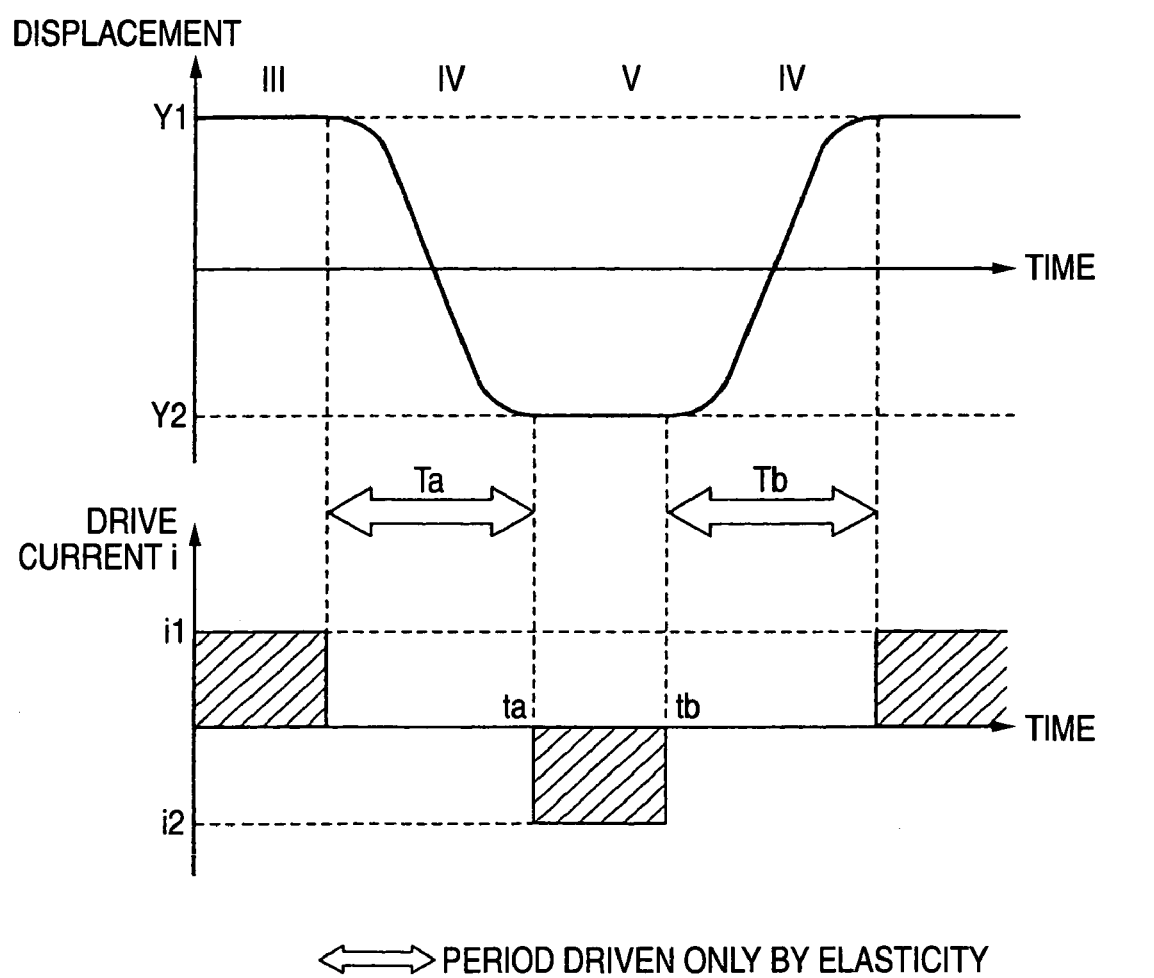
FIG. 15 is an explanatory diagram showing a correlation between a displacing amount and a drive current operated to a movable portion when operation of the movable portion is not attenuated.

FIG. 15 is an explanatory view showing a correlation between a displacing amount and a drive current operated to the movable portion when operation of the movable portion is not attenuated.

In state III shown in FIG. 15, the coil 68 is supplied with a drive current $i_1$ in the arrow mark H direction, the movable portion 67 is maintained in a state of being inclined to the left side at one normal position Y1 by an electromagnetic force generated in accordance with Fleming's left-hand rule. Here, when supply of the drive current $i_1$ is stopped, the movable portion 67 starts to be rotationally displaced in the clockwise direction (arrow mark L direction of FIG. 14(b)) by operation of the elastic energy accumulated in the hinges 69, 69 (state IV).

The movable portion 67 passes state I constituting a balance state, rotational displaced in the arrow mark L direction while accumulating again the elastic energy having a polarity reverse to that of state II and reaches other normal position Y2 to be brought into a state of being inclined to the right side. During a time period Ta until reaching other normal position Y2 after stopping to supply the drive current $i_1$, the movable portion 67 is displaced only by the elastic energy accumulated to the hinges 69, 69 without an operating force from outside.

When a drive current $i_2$ is supplied to the coil 68 in the arrow mark K direction at time ta at which the movable portion 67 reaches other normal position Y2, the movable portion 67 is maintained in a state of being inclined to the right side at other normal position Y2 by the electromagnetic force (state V). When the movable portion 67 reaches other normal position Y2, the movable portion 67 is not provided with an inertia force (inertia energy) and therefore, the movable portion 67 is not impacted to a stopping member. Therefore, the vibration is hampered from being brought about.

Next, when at time tb, supply of the drive current $i_2$ is stopped, the movable portion 67 is rotated in the counterclockwise direction (arrow mark J direction) by the elastic energy accumulated to the hinges 69, 69, and rotationally displaced while accumulating again the elastic energy to reach one normal position Y1. During a time period Tb until reaching one normal position Y1 after stopping supply of the drive current $i_2$, the movable portion 67 is displaced only by the elastic energy accumulated to the hinges 69, 69 without an operating force from outside.

When the movable portion 67 reaches one constant position Y1 again, the movable portion 67 is not provided with an inertia force (inertia energy) and therefore, a vibration is not brought about, when the drive current $i_1$ is supplied again to the coil 68 in the arrow mark H direction, the movable portion 67 is maintained in the state of being inclined to the left side at one normal position $i_1$ by the electromagnetic force (state the same as state III).

Thereafter, by supplying and stopping the current to the coil 68 while controlling the direction of the current, the movable portion 67 is displaced from one normal position Y1 to other normal position Y2, or from other normal position Y2 to one normal position Y1 without being vibrated. Therefore, it is not necessary to provide a time period of awaiting for attenuation and therefore, the movable portion 67 can be operated by a high speed cycle. Further, a power required for switching the movable portion 67 is a small power for maintaining the movable portion 67 at the normal positions Y1, Y2 and power consumption can be reduced.

Figure 16:
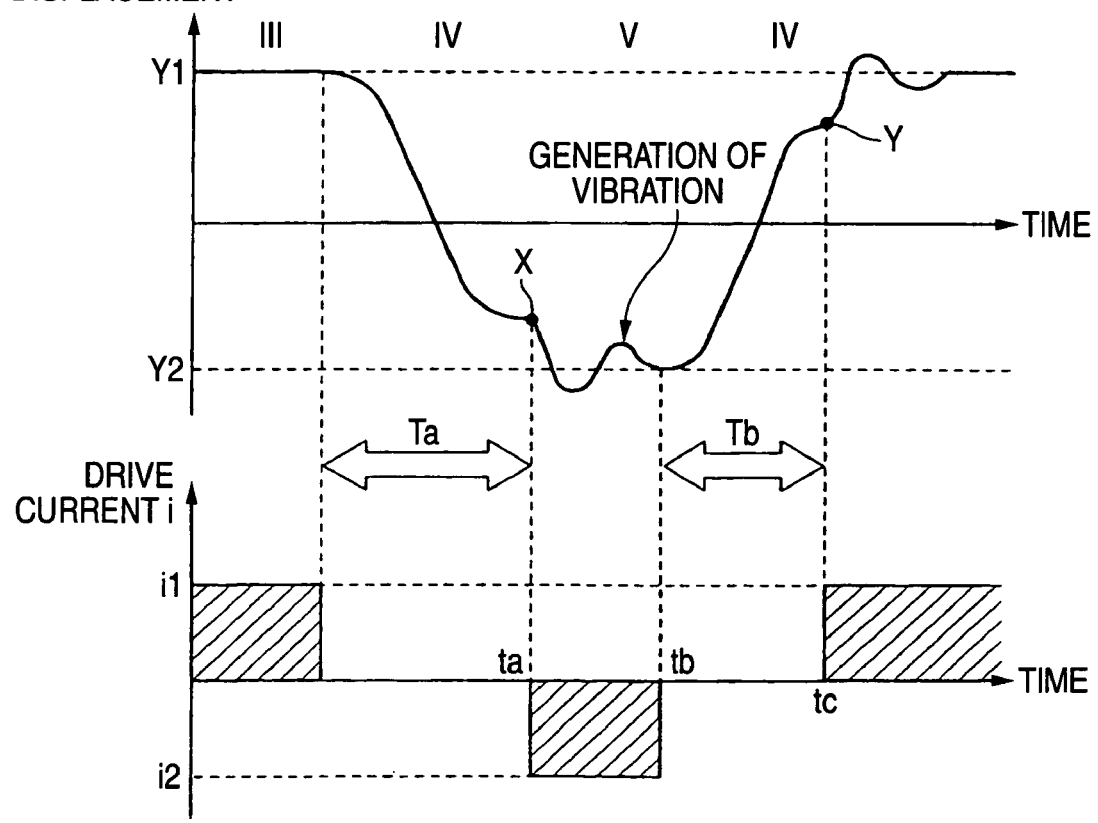
FIG. 16 is an explanatory diagram showing a correlation between the displacing amount and the drive current operated to the movable portion when operation of the movable portion is attenuated.
Figure 17:
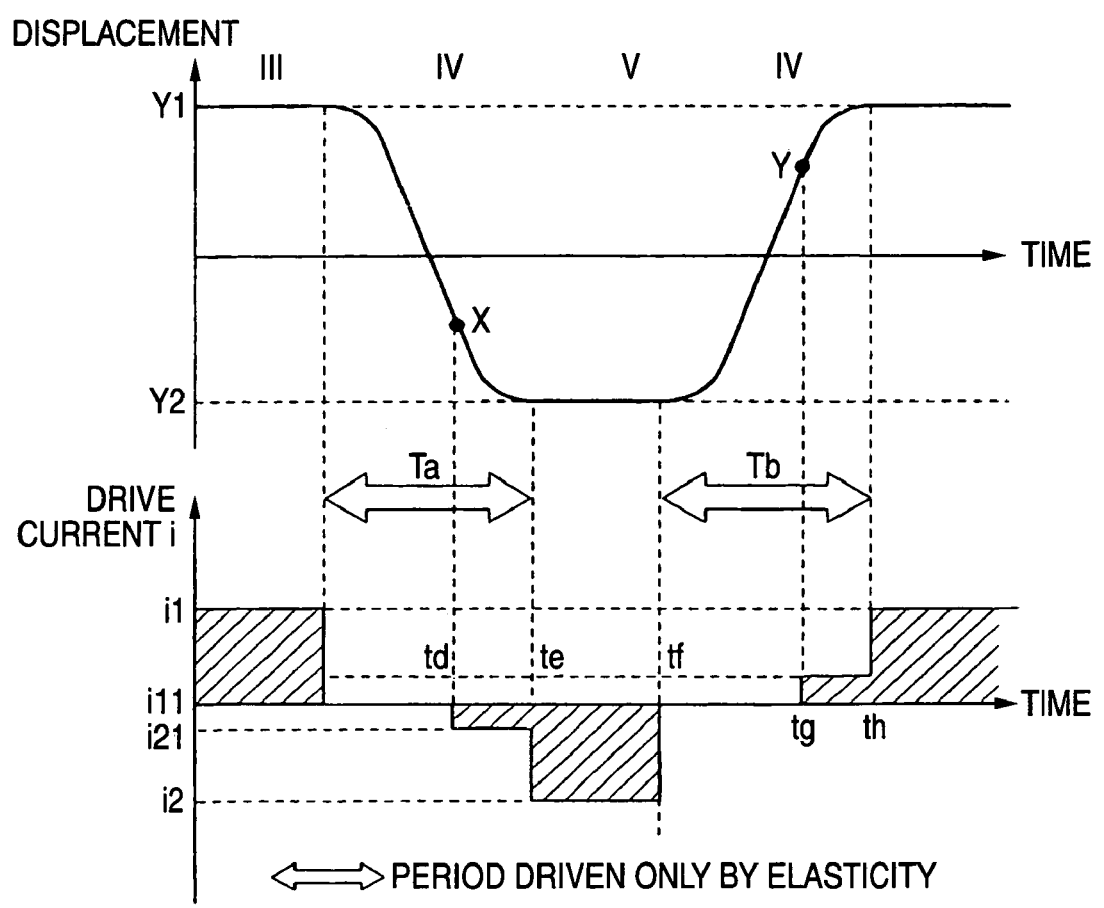
FIG. 17 is an explanatory diagram showing correlation between the displacing amount and the drive current operated to the movable portion improving a driving method of FIG. 16.

Next, an explanation will be given of a case in which the displacement of the movable portion is attenuated in reference to FIG. 16 and FIG. 17. FIG. 16 is an explanatory view showing a correlation between the displacing amount and the drive current operated to the movable portion when operation of the movable portion is attenuated, FIG. 17 is an explanatory view showing a correlation between the displacing amount and the drive current operated to the movable portion improving a driving method of FIG. 16. Further, FIG. 16 and FIG. 17 are similar to FIG. 15 except that an amount of displacing the movable portion is attenuated and therefore, the same portions are attached with the same notations and an explanation thereof will be simplified or omitted.

As shown by FIG. 16, when supply of the drive current $i_1$ is stopped in state III, the movable portion 67 is rotated in the clockwise direction (arrow mark L direction) by operation of the elastic energy accumulated to the hinges 69, 69, however, since the amount of displacing the movable portion 67 is attenuated, the inertia force is nullified at point X (time ta) before the movable portion 67 reaches other normal position Y2. Here, when the drive current $i_2$ is supplied to the coil 68 in the arrow mark K direction, the movable portion 67 is rotated in the clockwise direction by the electromagnetic force, finally brought into contact with the stopping member, not illustrated, and is maintained in the state of being inclined to the right side at other normal position Y2 (state V). Although at this occasion, a small vibration is generated, the vibration is a vibration weaker than that of the driving method of the background art and also an attenuating time period is far shorter.

Next, when supply of the drive current $i_2$ is stopped at time tb, the movable portion 67 is rotated in the counterclockwise direction (arrow mark J direction) by operation of the elastic energy accumulated to the hinges 69, 69 and is rotationally displaced while accumulating again the elastic energy. The inertia force of the movable portion 67 is nullified at point Y (time tc) before the movable portion 67 reaches one normal position Y1. At a time point (time tc) at which the movable portion 67 reaches point Y, when the drive current $i_1$ is supplied to the coil 68 in the arrow mark H direction, the movable portion 67 is rotated in the counterclockwise direction by the electromagnetic force, finally brought into contact with the stopping member, not illustrated, to be maintained in the state of being inclined to the left side at one normal position Y1

(state the same as state III). Also at this occasion, a weak vibration is brought about similarly.

Next, an explanation will be given of a driving method improved to prevent the weak vibration from being brought about in reference to FIG. 17.

As shown by FIG. 17, when supply of the drive current i1 is stopped in state III, the movable portion 67 is rotated in the clockwise direction (state IV), and reaches point X of nullifying the inertia force at time tb. By compensating for an amount of attenuation by supplying a small drive current $i_{21}$ to the coil 68 in the arrow mark K direction at time td, the movable portion 67 is slowly rotated to displace by a weak electromagnetic force and reaches other normal position Y2 at time te. Since the electromagnetic force at this occasion is weak and therefore, the movable portion 67 is slowly brought into contact with the stopping member and the vibration is not brought about. Here, the movable portion 67 is maintained in the state of being inclined to the right side by supplying the drive current $i_2$ in the arrow mark K direction to the coil 68 (state V).

When supply of the drive current i2 to the coil 68 is stopped at time tf, the movable portion 67 is rotated in the counterclockwise direction to accumulate again the elastic energy and reaches point Y of nullifying the inertia force to the movable portion 67 at time tg. Here, by compensating for an amount of attenuation by supplying a small drive current $i_{11}$ to the coil 68 in the arrow mark H direction, the movable portion 67 is slowly rotated to displace by a weak electromagnetic force and reaches again the normal position Y1 at time th. Also at this occasion, since the electromagnetic force is weak, the vibration is not brought about. Further, at time th, the drive current $i_1$ is supplied to the coil 68 to maintain the movable portion 67 in the state of being inclined to the left side (state the same as state III). Thereafter, the operation is repeatedly carried out similarly.

As described above, according to the driving method of the embodiment, even when operation of the movable portion is attenuated, by preliminarily applying a preliminary physical acting force for compensating for attenuation, that is, a drive current of a small current, the movable portion can be prevented from being vibrated and can be rotated to displace accurately.

Further, in the above-described explanation, a waveform of the drive current for compensating for attenuation may be any waveform, for example, may be a sine wave, a triangular wave, a sawtooth wave or the like. Further, in displacing the movable portion, the weak current may always be supplied, or may be supplied once or dividedly by a plurality of times. Further, although in the above-described explanation, there is constructed a constitution of installing the magnets on the both sides of the movable portion and arranging the coil at the movable portion as one mode, the invention is not limited thereto but there may be constructed a constitution in which the magnets and the coil are reversed, further, the both members may be formed by coils. Also in these cases, an effect similar to that of the above-described is achieved.

Figure 18:
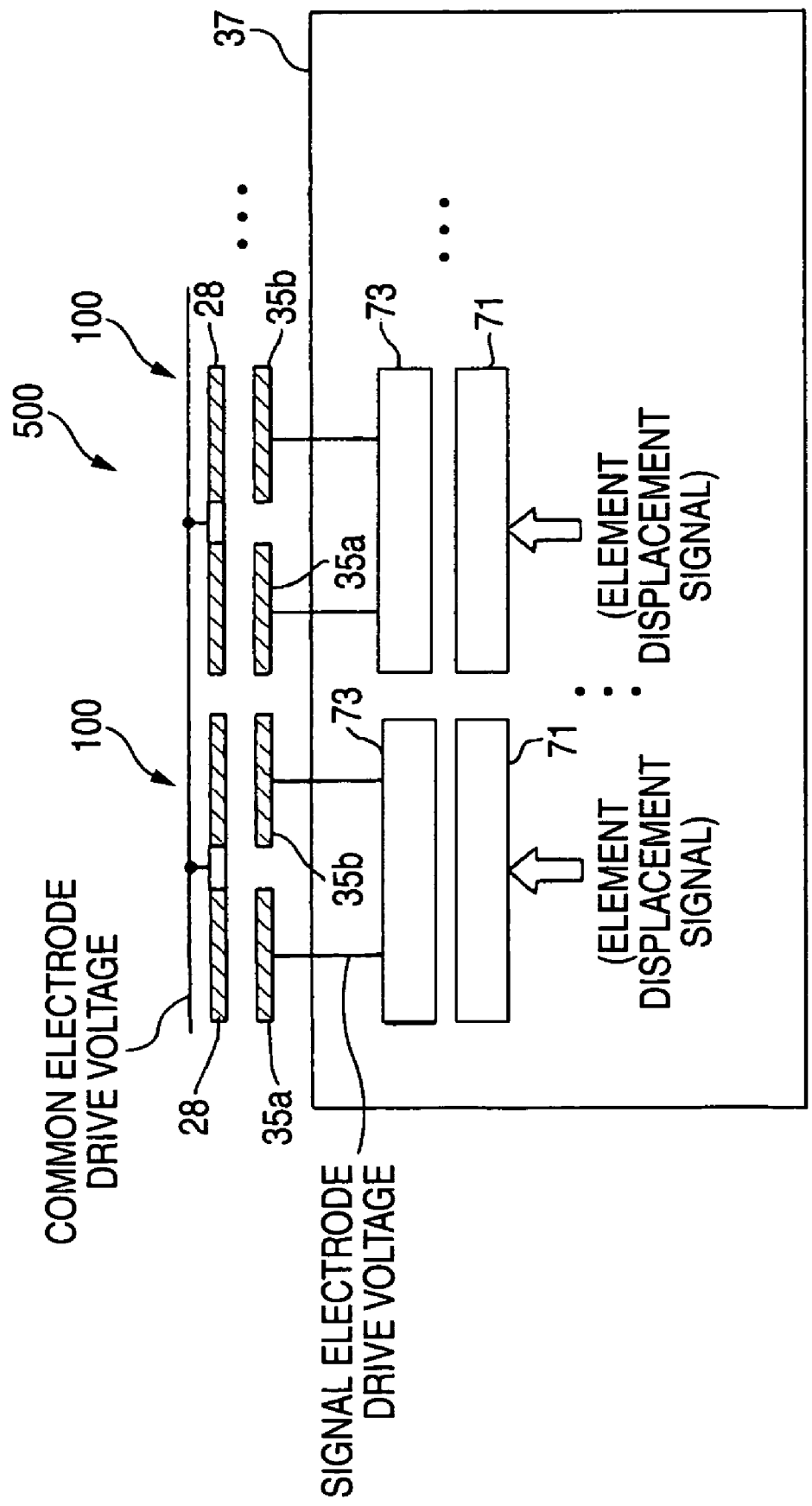
FIG. 18 is a conceptual diagram of a small electromechanical element array having a constitution of aligning a plurality of small electromechanical elements according to the invention.

Next, an explanation will be given of a small electromechanical element array aligned with a number of the small electromechanical elements in reference to FIG. 18. FIG. 18 is a conceptual diagram of a small electromechanical element array.

According to a small electromechanical element array 500, each of the small electromechanical elements 100 includes the drive circuit 37 including a memory circuit 71 (refer to FIG. 1B). By providing the memory circuit 71, an element displacing signal can previously be written to the memory circuit 71. That is, the memory circuit 71 is previously written with the element displacing signal. In switching the small electromechanical element 100, by an element displacing signal stored to the memory circuit 71 of each of the small electromechanical elements 100, and a drive voltage control circuit 73 constituting a control portion for controlling a voltage applied to the small electromechanical element 100, the drive voltages of the invention are outputted to the first address electrode 35a, the second address electrode 35b of the small electromechanical element 100 by a desired timing. At this occasion, a desired voltage is outputted to the movable electrode 28.

In this way, when the small electromechanical element 100 is driven by using the memory circuit 71, respectives of the plurality of small electromechanical elements 100 can easily be operated by an arbitrary drive pattern and the small electromechanical element 100 can actively be driven at faster speed. Further, although there is shown an example in which the small electromechanical element array 500 is constituted by the rotation type small electromechanical element 100 of the electrostatically driven type shown in FIG. 1, the invention is not limited thereto but the small electromechanical element array may be constituted by the small electromechanical elements 200, 300, 400 having other constitutions.

Further, the small electromechanical element array 500 is preferably provided with the control circuit 73 as the control portion for switching to drive each movable portion 27. According to the small electromechanical element array 500 including the control circuit 73, by controlling to drive the movable portion 27 by the control circuit 73, before the movable portion 27 reaches a finally displaced position, absolute values of voltages between the electrodes between the movable electrode 28 and the first address electrode 35a, the second address electrode 35b are reduced, or increased, or increased and reduced, and a vibration or overshoot by impact produced by reaching the finally displaced position by the movable portion 27 can be restrained.

The respective small electromechanical elements 100 of the small electromechanical element array 500 constituted in this way are driven without vibration based on the method of driving the small electromechanical element already explained in the first embodiment or the second embodiment by being controlled by the control circuits 73. The small electromechanical element array 500 having such a constitution can be functioned as a light modulating switch, an electric switch, a light switching switch.

Figure 19:
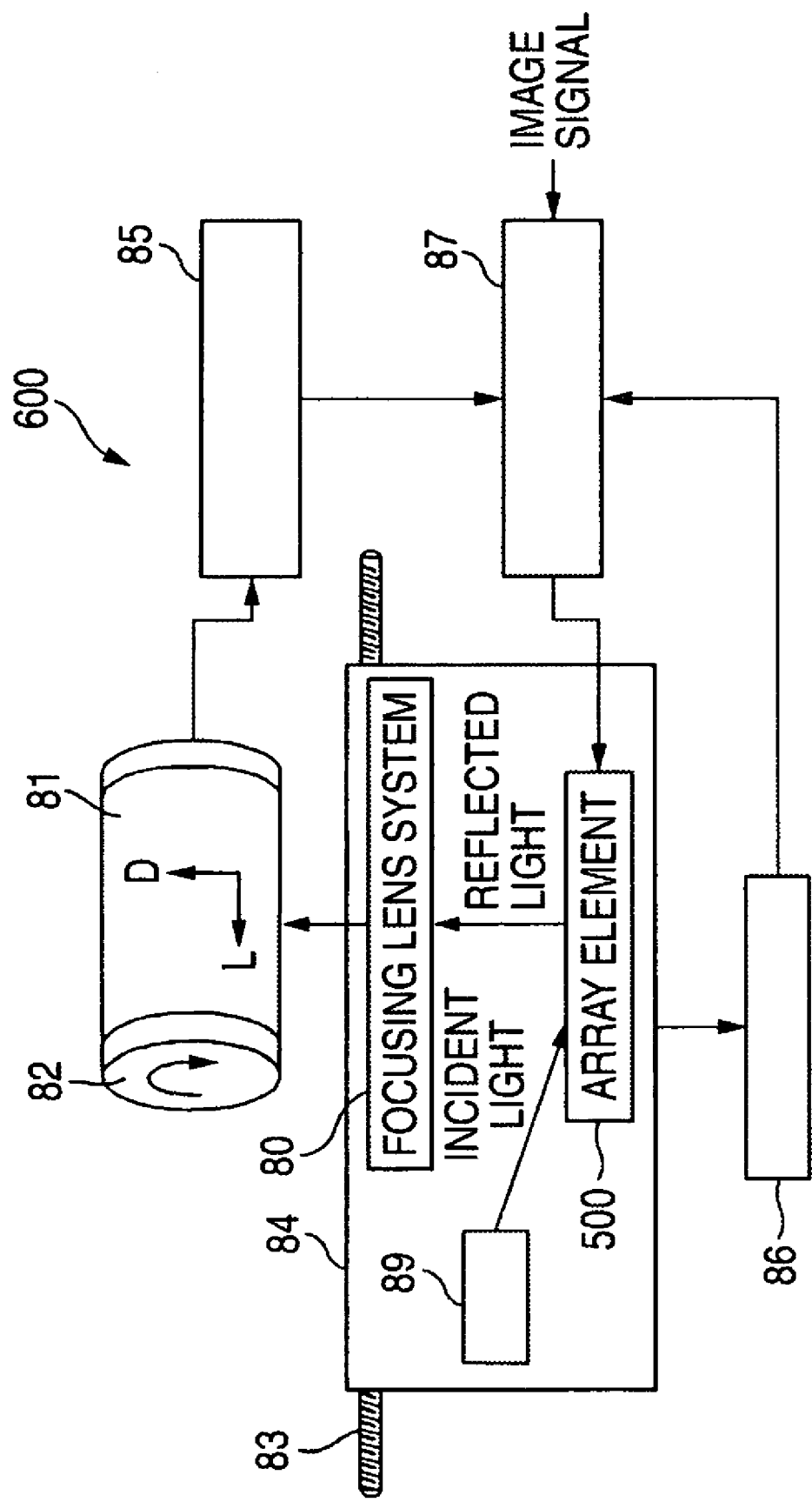
FIG. 19 is a general constitution diagram of an image forming apparatus using a small electromechanical element array of the invention.

Next, an explanation will be given of an exposing apparatus constituting an example of an image forming apparatus using the small electromechanical element array. FIG. 19 is a block constitution diagram of an exposing apparatus 600 using the small electromechanical element array 500 aligned to be formed with the rotation displacement type optical modulating element (small electromechanical element) 100 according to the above-described embodiment in a shape of a one-dimensional array. The small electromechanical element array 500 is preferably provided with a microlens array. The illustrated exposing apparatus 600 includes a drum 82 for adsorbing and holding an exposure object 81 at an outer peripheral face thereof, a sub scanning unit 94 movably supported by a guide shaft 83 arranged in parallel with a rotating shaft of the drum 82, a main scanning position detector 85, a sub scanning position detector 86, a modulated signal and light source signal generator 87.

The sub scanning unit 84 includes the small electromechanical element array 500 constituted by using the rotation displacement type optical modulating element 100, a laser light source 89 for irradiating beam light to the small electromechanical element array 500 based on a light source signal from the modulated signal and light source signal generator 87, and a focusing lens system 80 for converging reflected light in a direction of the exposing object 81 from the small electromechanical element array 500 for inclining respective reflecting films (micromirrors) by modulating signals from the modulated signal and light source signal generator 87 to be focused onto the exposing object 81 by changing a magnification.

According to the exposing apparatus 600 constituted in this way, when an image signal is inputted by the modulated signal and light source signal generator 87, a modulated signal in accordance with an image signal is outputted to the small electromechanical element array 500. Thereby, the respective reflecting films of the small electromechanical element array 500 are inclined in accordance with the image signals. When laser light from the laser light source 89 is made to be incident on the small electromechanical element array 500, only reflected by the reflecting film inclined to, for example, the left side passes through the focusing lens system 80 as ON signal to be incident on the exposure object 81, respective irradiated dot positions on the surface of the exposing object 81 are exposed and a dot position in correspondence with the reflecting film which is not inclined to the left side is not exposed.

By repeating such operation while being moved in the sub scanning direction, exposure of an amount of one line is finished, by being moved in the main scanning direction while carrying out exposure at respective lines, exposure of one sheet of the exposure object 81 is finished.

Further, the exposing apparatus may be applied with a small electromechanical element array aligned with a plurality of pieces of the rotation displacement type optical modulating elements 100 in a shape of a two-dimensional array. Further, the small electromechanical element array may not only be applied to the exposing apparatus but also to other optical apparatus. For example, the small electromechanical element array is applicable also to a digital exposing apparatus on demand used in a photolithography step, the image forming apparatus of a printing apparatus by digital exposure, a projecting display apparatus of a projector or the like, a microdisplay apparatus of a head mount display or the like.

The rotation displacement type optical modulating element according to the embodiment is highly reliable and driven at high speed, the drive circuit may be small and therefore, also reliability of the optical apparatus is promoted.

Next, an explanation will be given of a drive example when DMD is constructed by utilizing the small electromechanical element 100 according to the first embodiment mentioned above.

Figure 20:
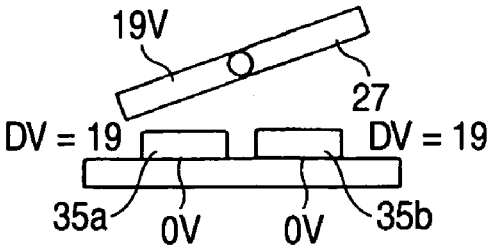
FIG. 20 is an explanatory view showing an example of applying a voltage of a small electromechanical element.
Figure 21:
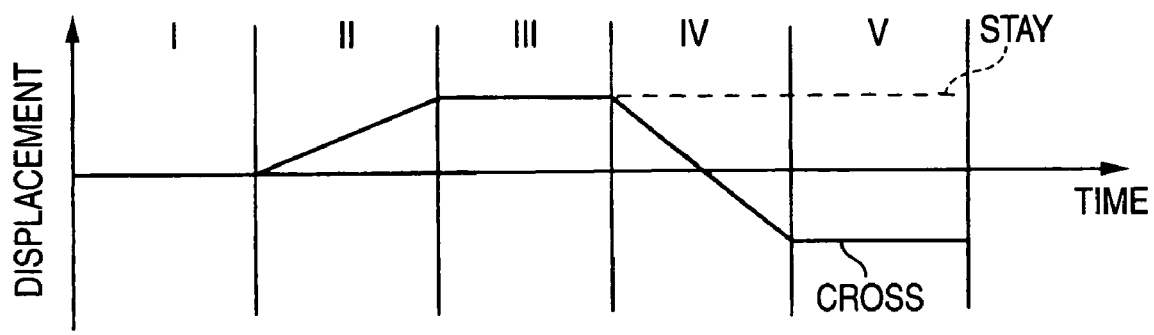
FIG. 21 is a timing chart diagram of an operation procedure shown in FIG. 20.

FIG. 20 is an explanatory view showing an example of applying a voltage of a small electromechanical element, FIG. 21 is a timing chart diagram of operation procedure shown in FIG. 20.

As shown by FIG. 20, a bias voltage Vb=19 V is applied to the movable portion 47 and 0 V of the address voltages Va1, Va2 is applied to the fixed electrode films 35a, 35b. Further, in state III, when the movable portion 47 is inclined to the side of the fixed electrode film 35a, the voltage difference between the movable portion 27 and the fixed electrode film 35a becomes DV=19 V, and the movable portion 27 is maintained. When a state of being inclined to the left side is changed to a state of being inclined to the right side, the bias voltage Vb of the movable portion 27 is set to 0 V. Then, the movable portion 27 is inclined to the side of the fixed electrode film 35b by the elastic force of the hinge, and the bias voltage Vb of 19 V is applied to the movable portion 27 under the state. Thereby, the movable portion 27 is maintained in the state of being inclined to the right side.

On the other hand, when the same state is maintained from state III, the bias voltage Vb of the movable portion 27 is maintained to be 19 V. Thereby, the movable portion 27 maintains the state of being inclined to the left side.

In this way, also in a case of utilizing the small electromechanical element to DMD, when an inclination of a movable mirror provided to the movable portion 27 is changed in accordance with image data, DMD can be driven by saved power by utilizing the elastic energy accumulated to the hinge. Further, wasteful acceleration energy is not loaded to the movable portion 27 and therefore, the vibration is restrained from being brought about after reaching respective normal positions.

As has been explained above, according to the method of driving the small electromechanical element and the small electromechanical element array of the embodiment, the movable portion of the small electromechanical element can be driven without vibration and by low voltage and low power consumption, thereby, the small electromechanical element can be operated by a high speed cycle.

Figure 22:
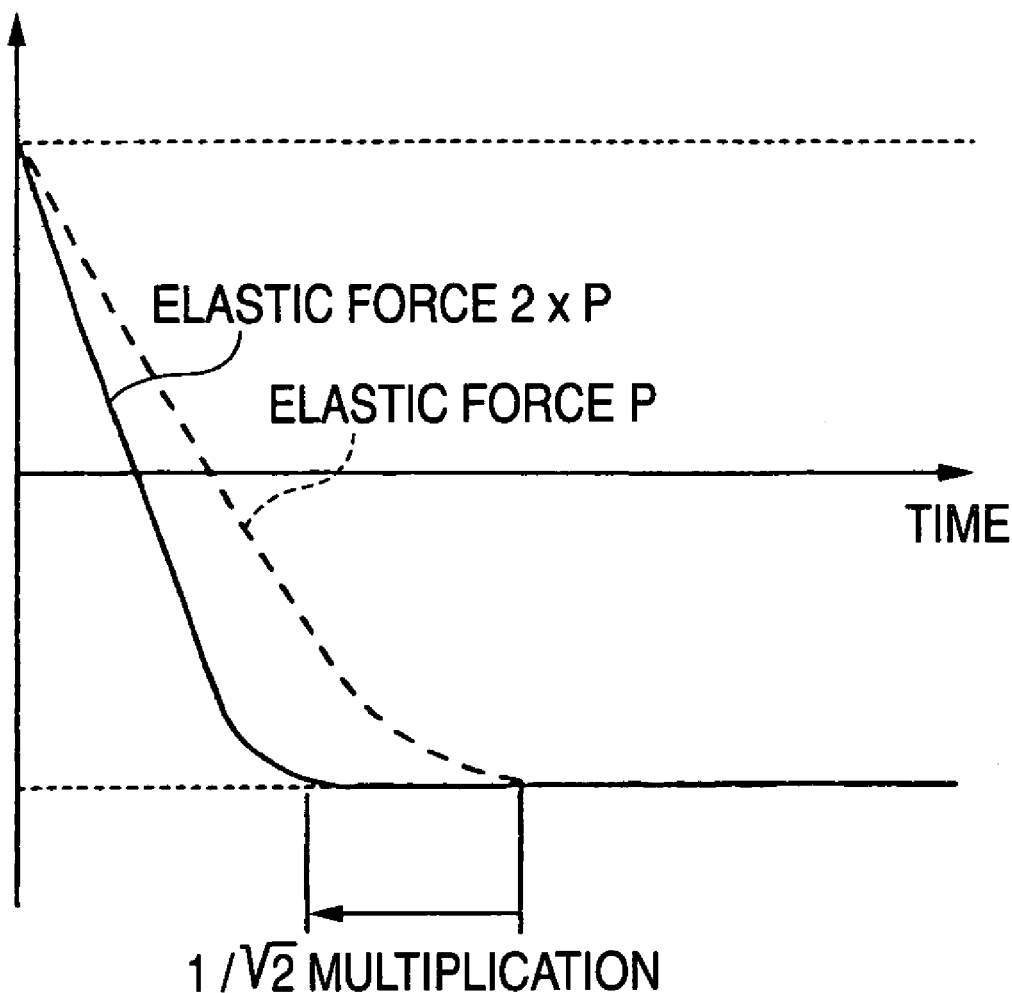
FIG. 22 is an explanatory diagram showing an effect of an elastic force of a hinge.
Figure 23:
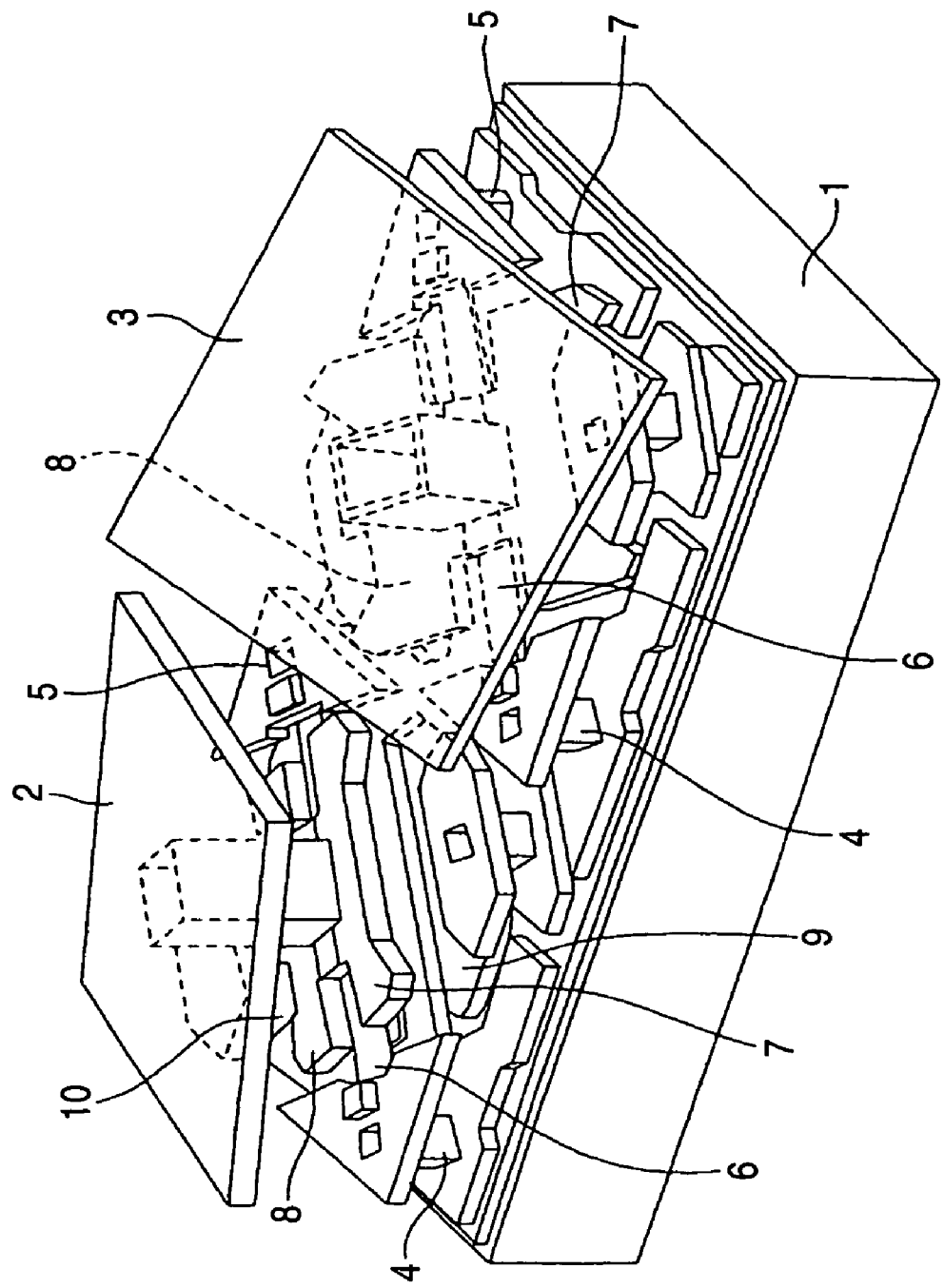
FIG. 23 is a constitution view of two elements of a small electromechanical element array of a background art.
Figure 24:
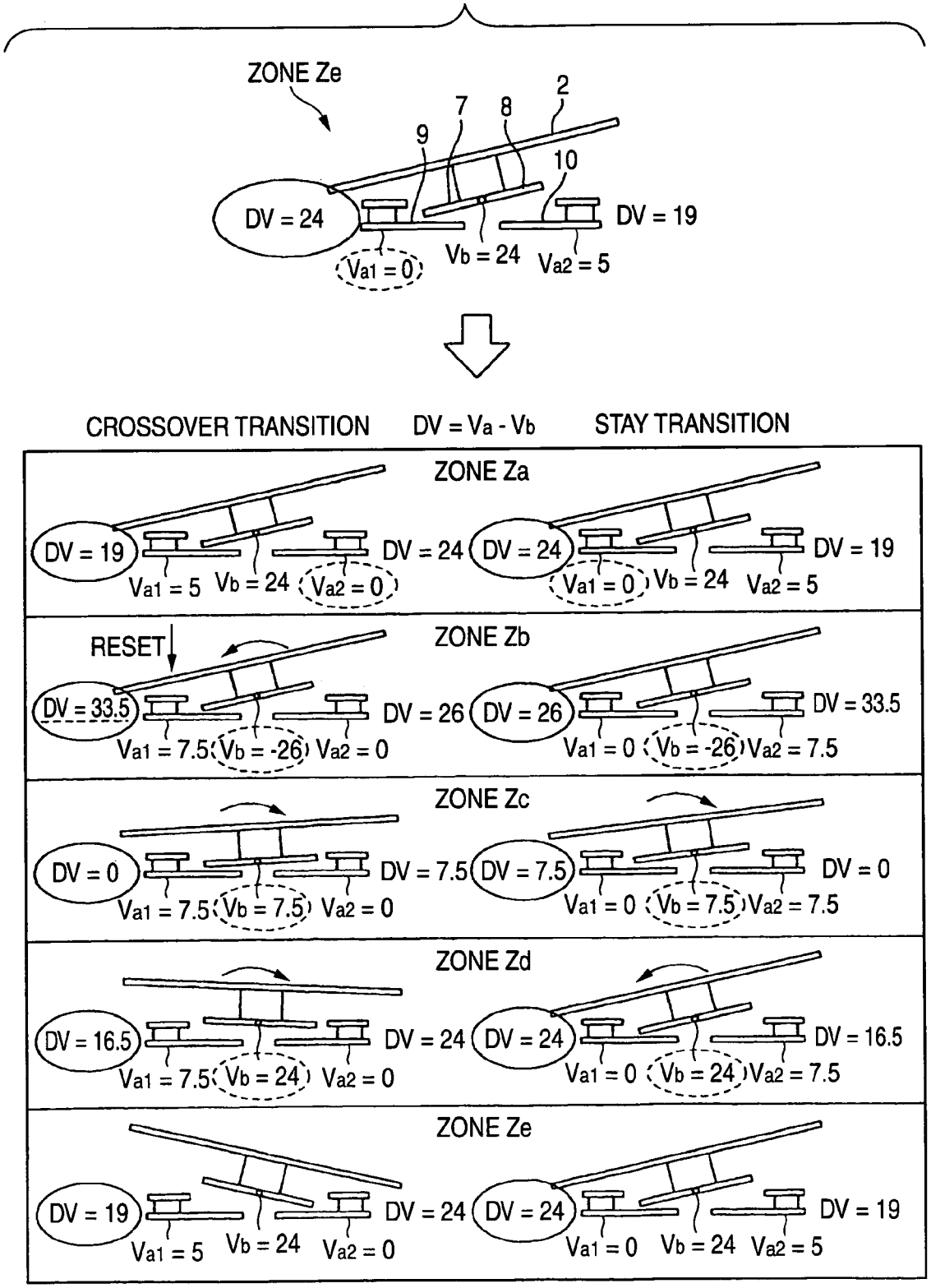
FIG. 24 is a general explanatory view showing a correlation between a displacement and a drive voltage of a movable portion of the background art.
Figure 25:
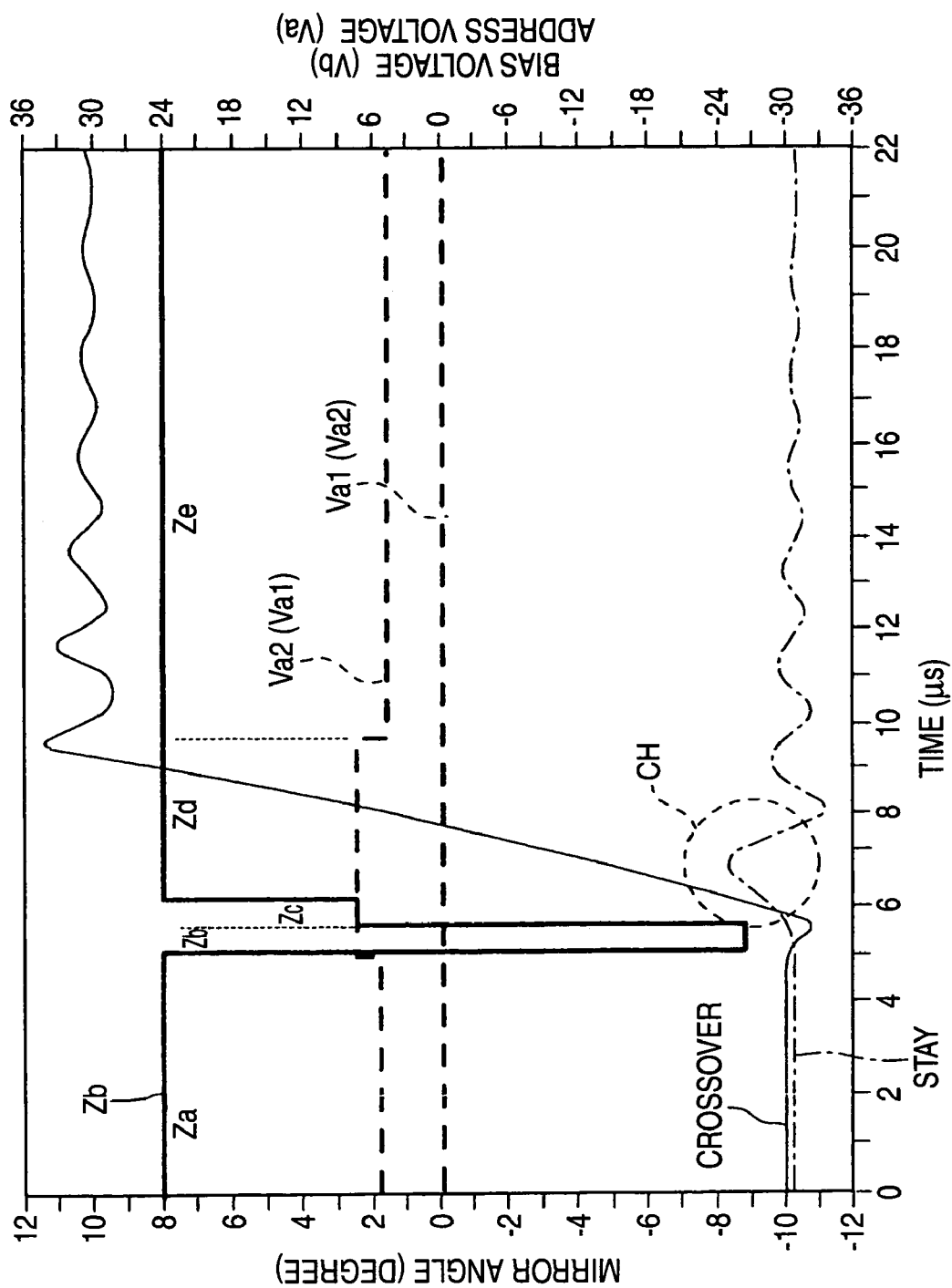
FIG. 25 is a timing chart diagram showing the correlation between the displacement amount and the drive voltage of the movable portion of the background art.

Further, when the elastic force of the hinge supporting the movable portion is intensified, a time period until carrying out a desired displacement can be shortened. Specifically, as shown by FIG. 22, it is known that when the elastic force of the hinge is doubled, a time period until finishing the displacement is shortened by $1/\sqrt{2}$ multiplication.

Further, the small electromechanical element, the small electromechanical element array, the image forming apparatus according to the invention are not limited to the above-described respective embodiments but can pertinently be modified or improved.

It will be apparent to those skilled in the art that various modifications and variations can be made to the described embodiments of the invention without departing from the spirit or scope of the invention. Thus, it is intended that the invention cover all modifications and variations of this invention consistent with the scope of the appended claims and their equivalents.

The present application claims foreign priority based on Japanese Patent Application No. JP2005-219236 filed Jul. 28 of 2005, the contents of which are incorporated herein by reference.

What is claimed is:

1. A method of driving a small electromechanical element, the small electromechanical element comprising: an elastic portion that accumulates an elastic energy by being deformed elastically; a movable portion supported by the elastic portion; and a drive source that exerts a physical acting force to maintain the movable portion, the method comprising: displacing the movable portion to one of a plurality of normal positions, which are destinations of displacing the movable portion, to accumulate a first elastic energy to the elastic portion; and stopping a physical acting force from the drive source after the displacing of the movable portion so that the first elastic energy accumulated to the elastic portion is released and a second elastic energy having a polarity reverse to that of the first elastic energy is accumulated to the elastic portion, so as to displace the movable portion to one of the other of the normal positions.

2. The method according to claim 1, which comprises maintaining the elastic energy by the physical acting force of the driving source after the displacing of the movable portion to each of the normal positions.

3. A method of driving a small electromechanical element, the small electromechanical element comprising: an elastic portion that accumulates an elastic energy by being deformed elastically; a movable portion supported by the elastic portion; and a drive source that exerts a physical acting force to maintain the movable portion, the method comprising:

displacing the movable portion to one of a plurality of normal positions, which are destinations of displacing the movable portion, to accumulate an elastic energy to the elastic portion;

releasing the elastic energy accumulated to the elastic portion and exerting a physical acting force from the drive source after exceeding substantially a half of a total amount of displacing the movable portion, so as to displace the movable portion to one of the other of the normal positions.

4. The method of driving a small electromechanical element according to claim 1, which further comprises exerting a preliminary physical acting force in the releasing of the first elastic energy, the preliminary physical acting force compensating for attenuating an operation of the movable portion.

5. The method of driving a small electromechanical element according to claim 1, wherein the physical acting force is an electrostatic force.

6. The method of driving a small electromechanical element according to claim 1, wherein the physical acting force is an electromagnetic force.

7. The method of driving a small electromechanical element according to claim 3, which further comprises exerting a preliminary physical acting force in the releasing of the elastic energy, the preliminary physical acting force compensating for attenuating an operation of the movable portion.

8. The method of driving a small electromechanical element according to claim 3, wherein the physical acting force is an electrostatic force.

9. The method of driving a small electromechanical element according to claim 3, wherein the physical acting force is an electromagnetic force.

10. A small electromechanical element array comprising:
a plurality of small electromechanical elements, each comprising: an elastic portion that accumulates an elastic energy by being deformed elastically; a movable portion supported by the elastic portion; and a drive source that exerts a physical acting force to maintain the movable portion, and a control portion that drives each of the small electromechanical elements based on a method according to claim 1.

11. An image forming apparatus comprising:
a light source;
a small electromechanical element array according to claim 10;
an optical system that irradiates light from the light source to the small electromechanical element array; and
a projecting optical system that projects light emitted from the optical system to an image forming face.

12. A small electromechanical element array comprising:
a plurality of small electromechanical elements, each comprising: an elastic portion that accumulates an elastic energy by being deformed elastically; a movable portion supported by the elastic portion; and a drive source that exerts a physical acting force to maintain the movable portion, and a control portion that drives each of the small electromechanical elements based on a method according to claim 3.

13. An image forming apparatus comprising:
a light source;
a small electromechanical element array according to claim 12;
an optical system that irradiates light from the light source to the small electromechanical element array; and
a projecting optical system that projects light emitted from the optical system to an image forming face.

14. The method according to claim 1, wherein the movable portion is displaced from one of the normal positions solely due to the first elastic portion accumulated to the elastic portion.

15. The method according to claim 3, wherein the movable portion is displaced from one of the normal positions solely due to the release of the elastic energy accumulated to the elastic portion.

16. The method according to claim 1, wherein the movable portion is displaced between the first and second normal positions through release of the elastic force from the first normal position and accumulation of elastic force toward the second normal position, and wherein a damping voltage is applied between release from the first normal position towards accumulation of elastic force of the second normal position.

* * * * *